(12) United States Patent
Chartier et al.

(10) Patent No.: US 11,978,869 B2
(45) Date of Patent: May 7, 2024

(54) BATTERY PACKS FOR BATTERY-POWERED APPLIANCES AND CONNECTION SYSTEM FOR SAME

(71) Applicant: Emerson Electric Co., St. Louis, MO (US)

(72) Inventors: Glen R. Chartier, Avon Lake, OH (US); Seth B. Bullock, Cleveland, OH (US); Billy Odon M. Yrad, Jr., Elyria, OH (US); Alex J. Wall, St. Louis, MO (US); Tony Le, St. Charles, MO (US); Scott Kruepke, Elyria, OH (US)

(73) Assignee: Emerson Electric Co., St. Louis, MO (US)

( * ) Notice: Subject to any disclaimer, the term of this patent is extended or adjusted under 35 U.S.C. 154(b) by 193 days.

(21) Appl. No.: 17/375,388

(22) Filed: Jul. 14, 2021

(65) Prior Publication Data
US 2022/0021062 A1 Jan. 20, 2022

Related U.S. Application Data

(60) Provisional application No. 62/705,784, filed on Jul. 15, 2020.

(51) Int. Cl.
H02J 7/00 (2006.01)
A47L 9/28 (2006.01)
(Continued)

(52) U.S. Cl.
CPC .......... *H01M 10/488* (2013.01); *A47L 9/2873* (2013.01); *A47L 9/2884* (2013.01);
(Continued)

(58) Field of Classification Search
CPC ............. H01M 10/488; H01M 10/425; H01M 50/204; H01M 50/247; H01M 50/256;
(Continued)

(56) References Cited

U.S. PATENT DOCUMENTS 5,349,282 A 9/1994 McClure
5,592,064 A 1/1997 Morita
(Continued)

FOREIGN PATENT DOCUMENTS

GB 2535192 A 8/2016
GB 2535192 A 8/2018
(Continued)

OTHER PUBLICATIONS

Extended European Search Report for European Application No. 21185953.3, dated Dec. 21, 2021, 7 pages.
(Continued)

Primary Examiner — Zixuan Zhou
(74) Attorney, Agent, or Firm — Armstrong Teasdale LLP

(57) ABSTRACT

A battery pack connection system includes a first battery pack, a second battery pack, and a battery receptacle. Each of the first and second battery packs includes a first guide slot, a second guide slot, and an electrical connector slot. The second battery pack has a power capacity and a width greater than the first battery pack. The battery receptacle defines an elongate passage sized and shaped to separately receive each of the first and second battery packs therein. The battery receptacle includes an electrical connector rail, a first guide rail sized and shaped to cooperatively engage the first guide slot of each of the first and second battery packs, and a second guide rail sized and shaped to cooperatively engage the second guide slot of each of the first and second battery packs.

14 Claims, 14 Drawing Sheets

(51) Int. Cl.
*H01M 10/42* (2006.01)
*H01M 10/48* (2006.01)
*H01M 50/204* (2021.01)
*H01M 50/247* (2021.01)
*H01M 50/256* (2021.01)
*H01M 50/284* (2021.01)

(52) U.S. Cl.
CPC ....... *H01M 10/425* (2013.01); *H01M 50/204* (2021.01); *H01M 50/247* (2021.01); *H01M 50/256* (2021.01); *H02J 7/0047* (2013.01); *H02J 7/0048* (2020.01); *H01M 50/284* (2021.01); *H01M 2220/30* (2013.01)

(58) Field of Classification Search
CPC ............ H01M 50/284; H01M 2220/30; A47L 9/2873; A47L 9/2884; H02J 7/0047–0048
USPC ......................................................... 320/112
See application file for complete search history.

(56) References Cited

U.S. PATENT DOCUMENTS

| | | | |
|---|---|---|---|
| 6,252,511 | B1 | 6/2001 | Mondshine et al. |
| 7,176,656 | B2* | 2/2007 | Feldmann ................ B25F 5/00 320/112 |
| 7,649,337 | B2 | 1/2010 | Uehlein-Proctor et al. |
| 8,015,661 | B2 | 9/2011 | Baer et al. |
| 8,354,183 | B2 | 1/2013 | Konuma et al. |
| 8,389,143 | B2 | 3/2013 | Roβkamp et al. |
| 8,732,896 | B2 | 5/2014 | Lucas et al. |
| 9,282,695 | B2 | 3/2016 | Goto |
| 9,419,258 | B2 | 8/2016 | Pickens et al. |
| 9,711,986 | B2 | 7/2017 | Sunderland et al. |
| 9,834,337 | B2 | 12/2017 | Roehm |
| 10,148,111 | B2 | 12/2018 | Reed |
| 10,245,028 | B2 | 4/2019 | Shelton, IV et al. |
| 10,342,401 | B2 | 7/2019 | Manion et al. |
| 10,413,146 | B2 | 9/2019 | Williams et al. |
| 2003/0070250 | A1* | 4/2003 | Roy ........................ A47L 5/36 15/327.5 |
| 2005/0155177 | A1 | 7/2005 | Baer et al. |
| 2007/0292749 | A1* | 12/2007 | Coombs .............. H01M 50/209 429/96 |
| 2008/0240358 | A1 | 10/2008 | Utschig et al. |
| 2009/0202894 | A1 | 8/2009 | Bublitz |
| 2009/0289805 | A1 | 11/2009 | Patrick et al. |
| 2010/0088843 | A1 | 4/2010 | Reed et al. |
| 2011/0033735 | A1 | 2/2011 | Kinoshita et al. |
| 2011/0147031 | A1* | 6/2011 | Matthias ................ B25F 5/02 173/171 |
| 2012/0251229 | A1 | 10/2012 | Liang et al. |
| 2016/0293912 | A1* | 10/2016 | Manion .................... A47L 5/24 |
| 2017/0007085 | A1* | 1/2017 | Tahara ...................... A47L 9/24 |
| 2017/0071431 | A1 | 3/2017 | Reed et al. |
| 2018/0130984 | A1 | 5/2018 | Miller et al. |
| 2019/0044110 | A1 | 2/2019 | Sheeks et al. |
| 2019/0059667 | A1 | 2/2019 | Manion et al. |
| 2019/0178219 | A1 | 6/2019 | Koenen |
| 2019/0298122 | A1* | 10/2019 | Tahara .................. A47L 7/0095 |
| 2020/0069903 | A1 | 3/2020 | Galbraith et al. |
| 2021/0151721 | A1* | 5/2021 | Liu ...................... H01M 50/507 |
| 2021/0288373 | A1* | 9/2021 | Varipatis .................. B25F 5/00 |

FOREIGN PATENT DOCUMENTS

| | | | |
|---|---|---|---|
| WO | WO-2010013839 A1 * | 2/2010 | .......... H01M 10/613 |
| WO | 2016085540 A1 | 6/2016 | |
| WO | 2018145324 A1 | 8/2018 | |
| WO | 2019213407 A1 | 11/2019 | |

OTHER PUBLICATIONS

Extended European Search Report for European Application No. 21185951.7, dated Dec. 3, 2021, 8 pages.
"Black + Decker Dustbuster Handheld Vacuum", Amazon Product Webpage, 14 pages, retrieved from the Internet on Jul. 14, 2021 at URL: https://www.amazon.com/dp/B07R9GP85M/ref=sspa_dk_detail_0?pd_rd_i=B07R9GP85M&pd_rd_w=XsapA&pf_rd_p=c83c55b0-5d97-454a-a592-a891098a9709&pd_rd_wg=gCOPW&pf_rd_r=S865366W468JSXQN9RG6&pd_rd_r=23272e30-4bdd-4def-a83a-19a11d91064c&spLa=ZW5jcnlwdGVkUXVhbGlmaWVyPU0EyOTlaSzRMM08xWVpKJmVuY3J5cHRlZElkPUEwNDAyOTQ0UVJSQ0c0R0pUN0lBJmVuY3J5cHRlZEFkSWQ9QTAwODYwNTMxQ05kNaQUVKRFZXJndpZGdldE5hbWU9c3BfZGV0YWlsX3RoZW1lhdGlqJmFjdGlvbjljbGlja1JZGlyZWN0JmRvTm90TG9nQ2xpY2s9dHJ1ZQ&th=1.
"Cordless Vacuum Cleaner", Amazon Product Webpage, 9 pages, retrieved from the Internet on Jul. 14, 2021 at URL: https://www.amazon.com/Cordless-Cleaner-Handheld-Lightweight-Cleaning/dp/B07TSBRZMN.
Hushtone 6Q Cordless Backpack User Manual, accessed Jul. 9, 2020, pp. 1-19.
"Rayovac® Battery Charger", ULINE Product Webpage, 1 page, retrieved from the Internet on Jul. 14, 2021 at URL: https://www.uline.com/Product/Detail/H-3035/Batteries/Rayovac-Battery-Charger?pricode=WB1735&gadtype=pla&id=H-3035&gclid=CjwKCAjw_LL2BRAkEiwAv2Y3STjFc2jmLvY1--Ma909dpCaGmzHmwZCDV4CedOqPTERAJhEiIL_T3xoCWV4QAvD_BwE&gclsrc=aw.ds.
"VacLife Handheld Vacuum", Amazon Product Webpage, 12 pages, retrieved from the Internet on Jul. 14, 2021 at URL: https://www.amazon.com/VacLife-Handheld-Cordless-Rechargeable-Cleaning/dp/B07QH5JV8K.

* cited by examiner

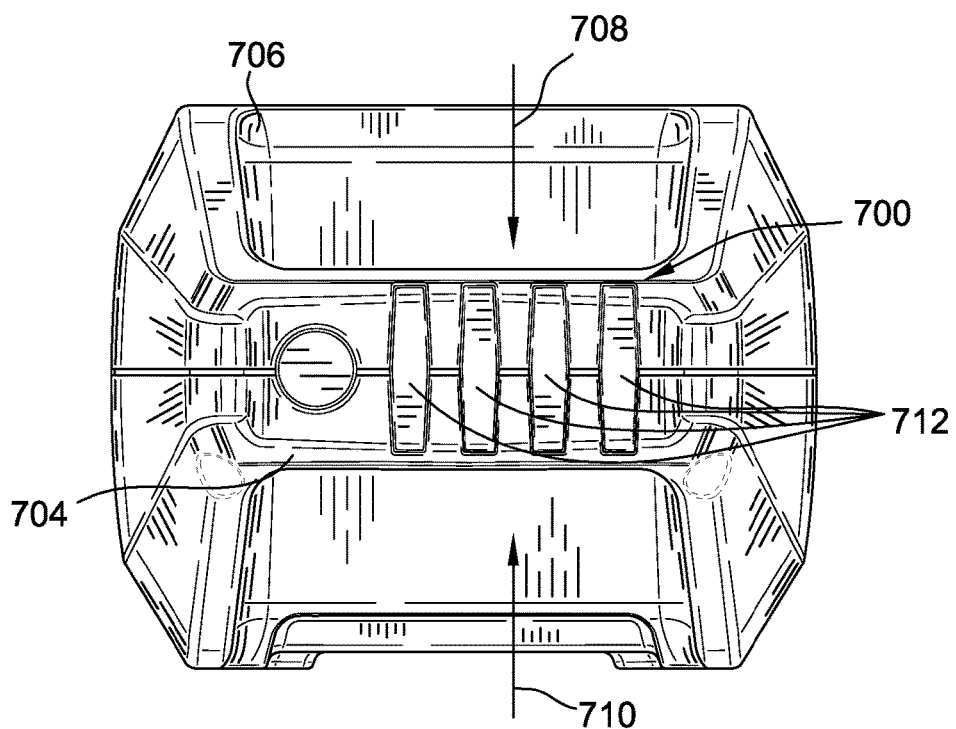
FIG. 20
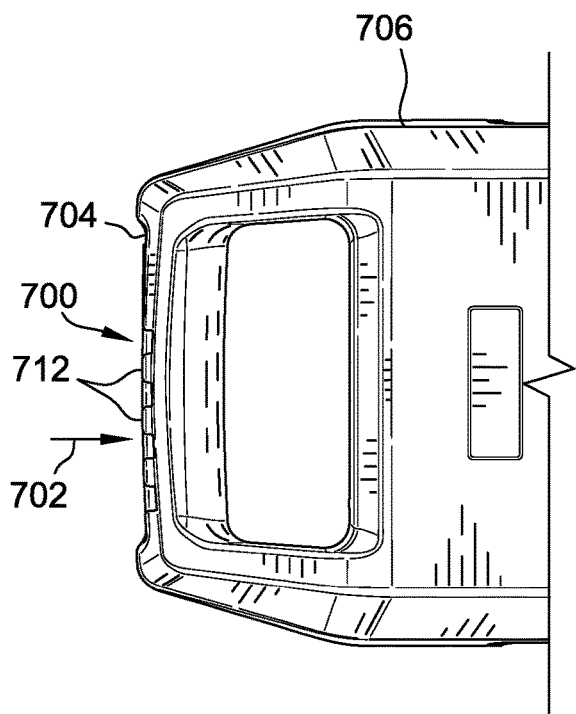 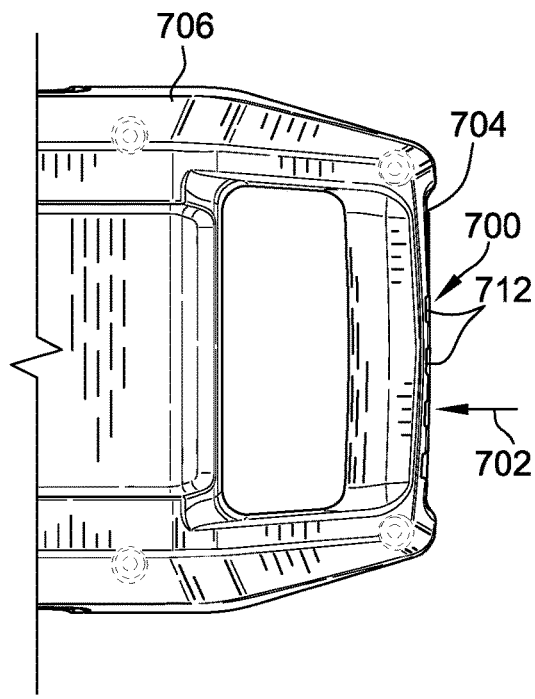
FIG. 21　　　FIG. 22

BATTERY PACKS FOR BATTERY-POWERED APPLIANCES AND CONNECTION SYSTEM FOR SAME

CROSS-REFERENCE TO RELATED APPLICATION

This application claims the benefit of U.S. Provisional Application Ser. No. 62/705,784 filed Jul. 15, 2020, entitled "BATTERY PACKS FOR BATTERY-POWERED APPLIANCES AND CONNECTION SYSTEM FOR SAME," which is incorporated herein by reference in its entirety.

FIELD

The field of the disclosure relates generally to battery-powered appliances, and more particularly, to battery packs for battery-powered appliances and connection systems for use with such battery packs.

BACKGROUND

Battery-powered appliances, such as cordless power tools, power equipment, cordless vacuum cleaners, and cordless lawn equipment (e.g., electric blowers, lawn mowers, etc.), typically include a battery or battery pack that supplies power to the battery-powered appliance. Some battery packs are removable from the appliance, for example, to allow a depleted battery pack to be replaced with a charged battery pack.

Some battery-powered appliances include battery packs having different power capacities. However, many of these battery-powered appliances typically require that the battery pack have a common size, shape, and/or form factor to connect to a battery receptacle of the appliance. As a result, battery packs having lower power capacities are often made larger than otherwise required to conform with the common form factor of high power capacity batteries.

Additionally, many appliances require that the battery pack be precisely aligned with the battery receptacle and associated electrical contacts to connect the battery pack to the appliance. Such connection systems are less than optimal for battery-powered appliances worn by a user during use (e.g., backpack vacuum cleaners) because the user generally needs to remove the appliance to connect or exchange a battery pack, resulting in additional down time and energy expended by the user.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a battery pack connection system for a battery-powered appliance includes a first battery pack, a second battery pack, and a battery receptacle. Each of the first and second battery packs includes a first guide slot, a second guide slot, and an electrical connector slot including an electrical connector. The second battery pack has a power capacity and a width greater than the first battery pack. The battery receptacle defines an elongate passage extending longitudinally from an insertion end to a terminal end. The elongate passage is sized and shaped to separately receive each of the first and second battery packs therein. The battery receptacle includes an electrical connector rail extending longitudinally and including an electrical receptacle that electrically connects to the electrical connector of each of the first and second battery packs, a first guide rail extending longitudinally within the passage and sized and shaped to cooperatively engage the first guide slot of each of the first and second battery packs, and a second guide rail extending longitudinally within the passage and sized and shaped to cooperatively engage the second guide slot of each of the first and second battery packs.

In another aspect, a battery-powered appliance system includes a first battery pack, a second battery pack having a power capacity and a width greater than the first battery pack, and a battery-powered appliance. The battery-powered appliance includes a battery receptacle including an electrical receptacle, and a motor connected to the electrical receptacle to receive power from one of the first battery pack and the second battery pack when one of the first battery pack and the second battery pack is connected thereto. The battery receptacle defines an elongate passage that extends longitudinally from an insertion end to a terminal end. The elongate passage is sized and shaped to separately receive each of the first and second battery packs therein.

In yet another aspect, a method includes positioning a battery-powered appliance on a user's back, removing a first battery pack from a battery receptacle of the battery-powered appliance while the battery-powered appliance is on the user's back, and inserting a second battery pack into the battery receptacle while the battery-powered appliance is on the user's back, wherein the second battery pack has a power capacity and a width that is different from the first battery pack.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 20 is an end view of a battery gauge suitable for use with the battery packs disclosed herein.

FIG. 21 is a top view of the battery gauge shown in FIG. 20.

FIG. 22 is a bottom view of the battery gauge shown in FIG. 20.

Corresponding reference characters indicate corresponding parts throughout the several views of the drawings.

DETAILED DESCRIPTION

Figure 1:
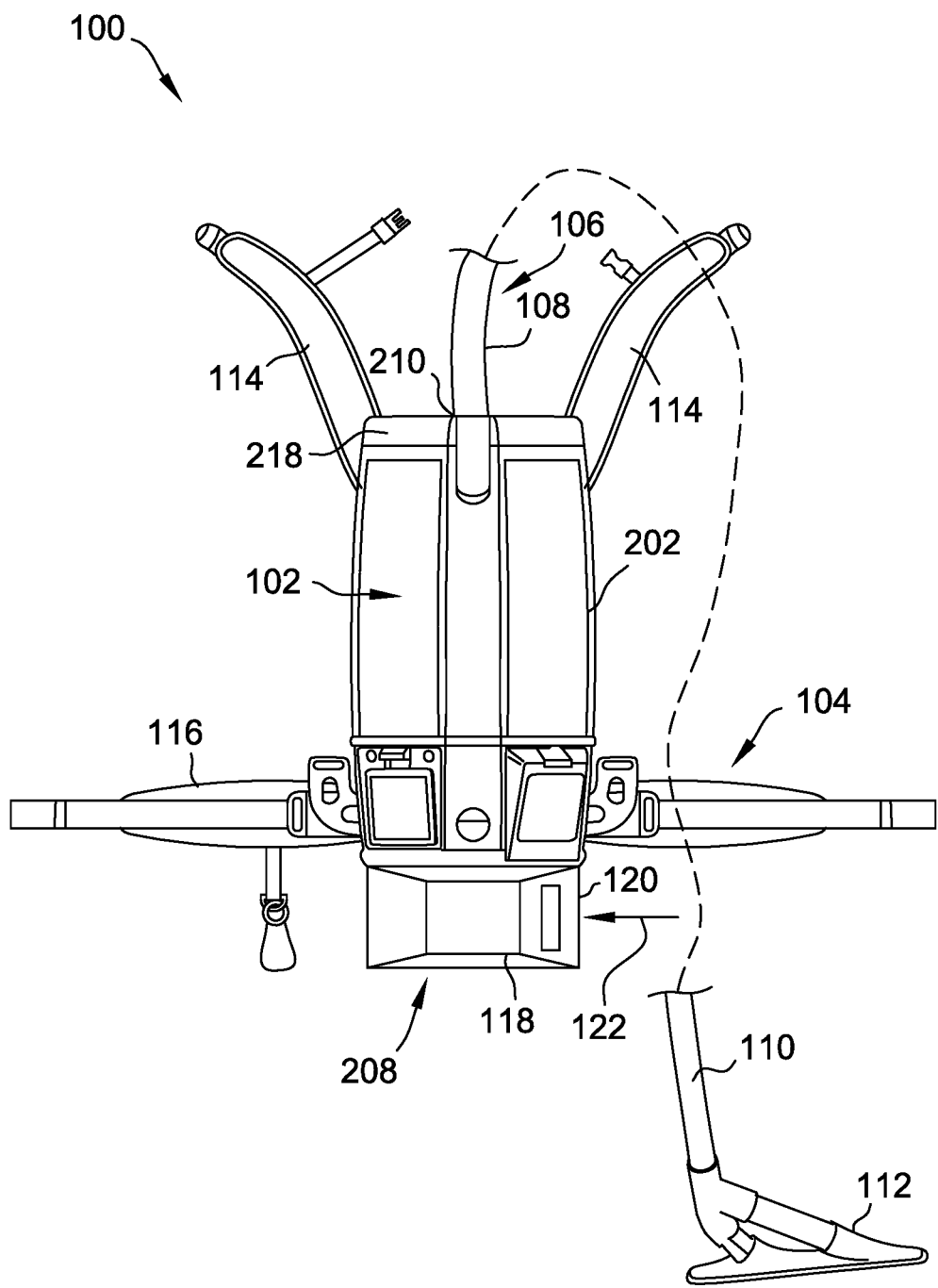
FIG. 1 is a perspective view of an example battery-powered appliance, illustrated in the form of a cordless vacuum cleaner.

FIG. 1 is a perspective view of an example portable, battery-powered appliance 100, illustrated in the form of a cordless backpack vacuum cleaner. Although the appliance 100 is shown and described herein with reference to a backpack-mounted vacuum cleaner, battery-powered appliances consistent with this disclosure may be embodied in other types and in other combinations including, for example and without limitation, wet/dry vacuum cleaners, canister vacuum cleaners, upright vacuum cleaners, blowers, sprayers, and power tools and equipment (e.g., power threading machines, pipe saws, pipe beveling machines, and drain cleaning machines).

In the example embodiment, the appliance 100 includes a vacuum cleaner assembly 102 that is carried on a user's back via a harness or backpack assembly 104, and a vacuum conduit 106 connected to the vacuum cleaner assembly 102. The vacuum conduit 106 may generally include any suitable conduit for directing suction and/or forced air generated by the appliance 100, including, for example and without limitation, vacuum hoses, vacuum wands or tubes, surface cleaning tools, and combinations thereof. In the illustrated embodiment, the vacuum conduit 106 includes a hose 108 extending from a top of the vacuum cleaner assembly 102, a vacuum cleaner wand 110 connected to the hose 108, and a vacuum cleaner floor tool 112 connected to a distal end of the wand 110.

The backpack assembly 104 is sized and shaped to be worn by a user of the appliance 100 (e.g., on the user's back or shoulders) to facilitate carrying the appliance 100 during use. In the illustrated embodiment, the backpack assembly 104 includes two shoulder straps 114 and a waist belt 116 for securing the backpack assembly 104 and appliance 100 to the torso of a user. In other embodiments, the backpack assembly 104 may have any suitable configuration that enables the appliance 100 to function as described herein.

Figure 2:
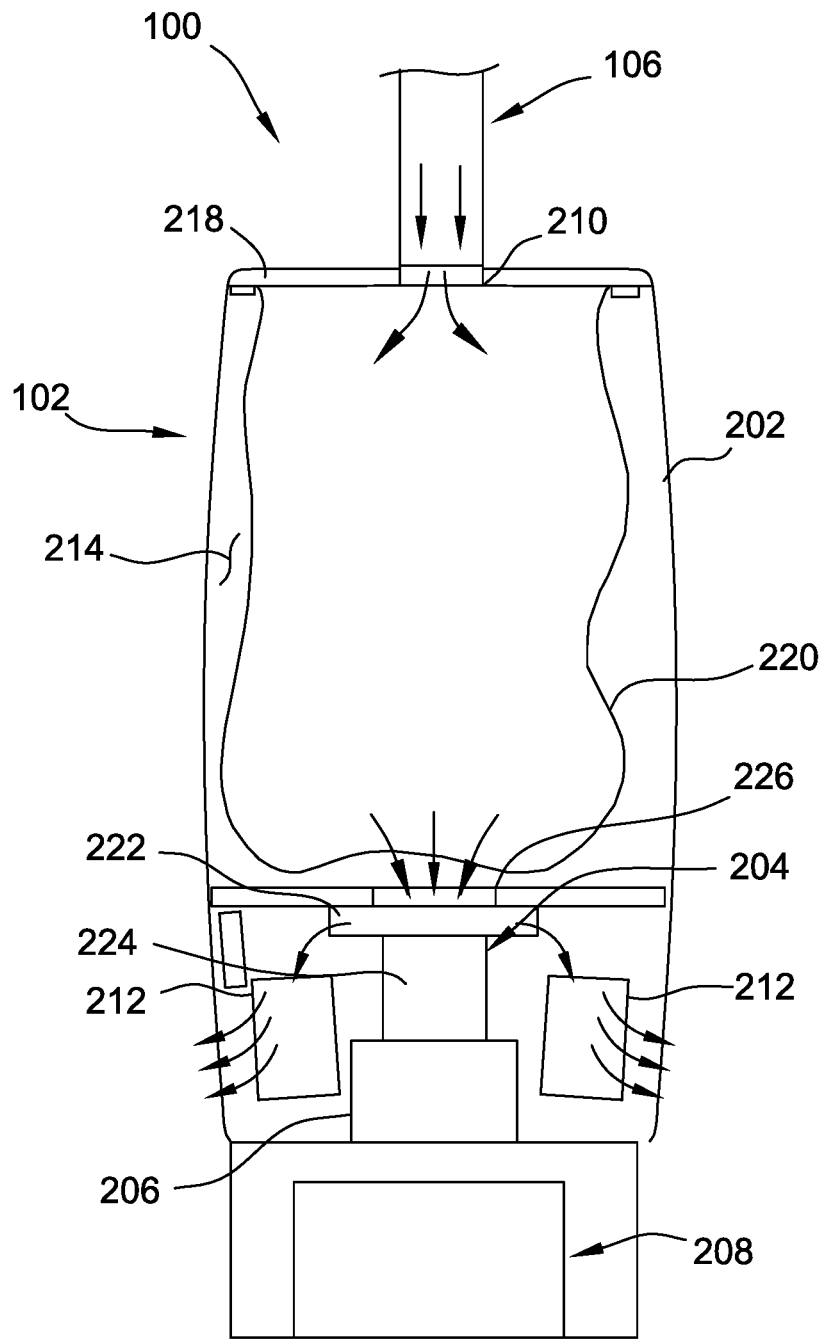
FIG. 2 is a side schematic view of the battery-powered appliance shown in FIG. 1.
Figure 3:
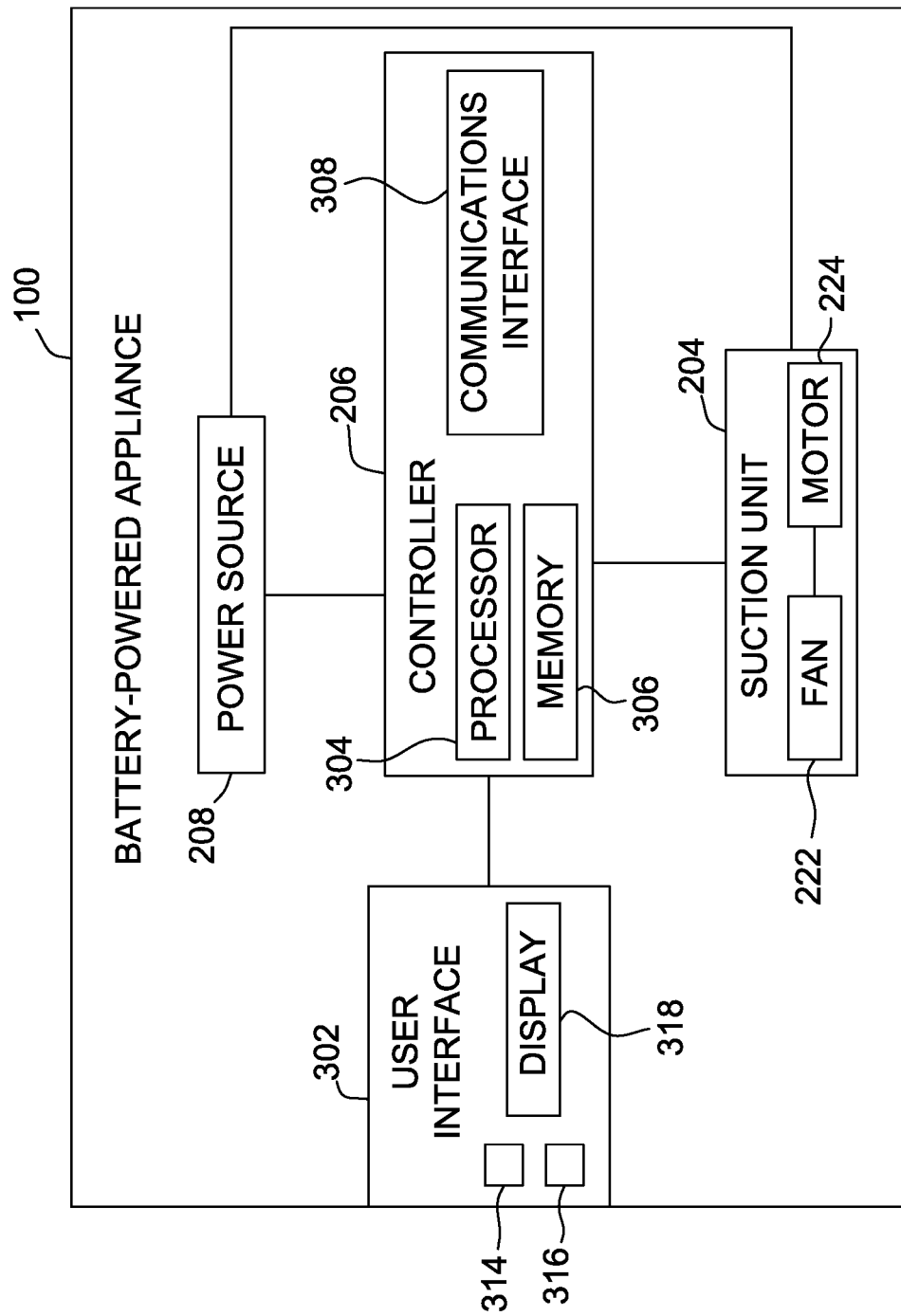
FIG. 3 is a block diagram of the battery-powered appliance shown in FIG. 1.

With additional reference to FIGS. 2 and 3, the vacuum cleaner assembly 102 includes a housing 202, a suction unit 204 enclosed within the housing 202, a controller 206, and a power source 208. The components and connections shown in FIG. 3 are a functional example only. Other embodiments may include different components, more or fewer components, components connected to different components, and/or different polarity connections.

The housing 202 defines an inlet 210, at least one exhaust or outlet 212, and a debris chamber 214 connected in fluid communication between the inlet 210 and the outlet 212. In the example embodiment, the inlet 210 is defined at a top of the housing 202, and the housing 202 includes two outlets 212 defined adjacent a bottom of the housing 202. In other embodiments, the inlet 210 and the outlet(s) 212 may be defined at any suitable portion of the appliance 100 that enables the appliance 100 to function as described herein. Further, the appliance 100 may include more than or fewer than two outlets 212.

In the illustrated embodiment, the housing 202 includes an access door or lid 218 that provides access to the debris chamber 214, for example, to empty debris collected within the debris chamber 214. The inlet 210 is defined in the lid 218 in the example embodiment. Further, the example housing 202 is adapted to receive a filter 220 within the debris chamber 214 to filter out fine debris and small particles from the air flow through the housing 202. In the illustrated embodiment, the filter 220 is a bag filter, although the appliance 100 may be operable with other types of filters, including, for example and without limitation, cartridge filters.

The suction unit 204 is operable to generate airflow (indicated by arrows in FIG. 2) through the housing 202 from the inlet 210 to the outlet 212 so as to draw debris into the debris chamber 214 through the inlet 210 by way of the vacuum conduit 106 (shown in FIG. 1). The suction unit 204 includes a fan or impeller 222 and a motor 224 operatively connected to the impeller 222 (collectively referred to herein as a "motor assembly") to drive the impeller 222 and generate airflow through the housing 202. The motor assembly is connected to the housing 202 and positioned adjacent the debris chamber 214 such that the impeller 222 receives airflow through an impeller inlet 226 defined by the housing 202. In certain embodiments, the motor assembly may also be adapted to operate in a "reverse" mode in which the motor assembly generates airflow from the outlet 212 to the inlet 210, so as to enable the appliance 100 to operate as a blower.

The controller 206 is generally configured to control one or more operations or processes of the appliance 100. In some embodiments, for example, the controller 206 receives user input from a user interface 302 of appliance 100, and controls one or more components of appliance 100 in response to such user inputs. In some embodiments, for example, the controller 206 controls the supply of power from the power source 208 to the vacuum suction unit 204 based on user input received from the user interface 302. For example, the controller 206 operates the motor 224 in response to user input received from a power switch 314 and a speed selection switch 316 of the user interface 302. The controller 206 may regulate or control electrical power supplied to appliance 100, such as from power source 208. For example, the controller 206 of the appliance 100 may include one or more power converters or regulators configured to control or regulate the electrical power supplied to components of the appliance 100, such as the motor 224 of vacuum suction unit 204. In some embodiments, for example, the controller 206 may include one or more DC power converters or regulators configured to control or regulate DC power supplied by the power source. Such power converters and regulators may be incorporated or integrated within components of the appliance 100, such as the vacuum suction unit 204 and/or within the motor 224. The controller 206 may also display information about the appliance 100 to the user through a display 318 of the user interface 302.

The controller 206 may generally include any suitable computer and/or other processing unit, including any suitable combination of computers, processing units and/or the like that may be operated independently or in connection within one another. The controller 206 may include one or more processor(s) 304 and associated memory device(s) 306 containing instructions that cause the processor 304 (i.e., "configure the processor" or "program the processor") to perform a variety of computer-implemented functions (e.g., performing the calculations, determinations, and functions disclosed herein). As used herein, the term "processor" refers not only to integrated circuits, but also refers to a controller, a microcontroller, a microcomputer, a programmable logic controller (PLC), an application specific integrated circuit, and other programmable circuits. Additionally, the memory device(s) 306 of controller 206 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 306 may generally be configured to store suitable computer-readable instructions that, when implemented by the processor(s), configure or cause the controller 206 to perform various functions including, but not limited to, controlling appliance 100, controlling operation of vacuum suction unit 204, receiving inputs from user interface 302, providing output to an operator via user interface 302, and/or various other suitable computer-implemented functions.

The controller 206 includes a communications interface 308. Communications interface 308 allows the appliance 100 (and more particularly, the controller 206) to communicate with remote devices and systems as part of a wired or wireless communication network. Wireless network interfaces may include a radio frequency (RF) transceiver, a Bluetooth® adapter, a Wi-Fi transceiver, a ZigBee® transceiver, a near field communication (NFC) transceiver, an infrared (IR) transceiver, and/or any other device and communication protocol for wireless communication. (Bluetooth is a registered trademark of Bluetooth Special Interest Group of Kirkland, Washington; ZigBee is a registered trademark of the ZigBee Alliance of San Ramon, California) Wired network interfaces may use any suitable wired communication protocol for direct communication including, without limitation, USB, RS232, I2C, SPI, analog, and proprietary I/O protocols. Moreover, in some embodiments, the wired network interfaces include a wired network adapter allowing the computing device to be coupled to a network, such as the Internet, a local area network (LAN), a wide area network (WAN), a mesh network, and/or any other network to communicate with remote devices and systems via the network. Controller 206 transmits and receives communications over the communication network using messages formatted according to an appropriate network communication protocol. In some embodiments, the network communication protocol is an Ethernet communication protocol or an Institute of Electrical and Electronics Engineers (IEEE) 802.11 based communication protocol. In some embodiments, the communications interface 308 includes wired and wireless communications interfaces. In some embodiments, the communications interface 308 includes a wired communication interface for communicative connection to a communication interface in an automobile.

The communications interface 308 may be used, for example, for communicating diagnostics information, providing the serial number of the appliance 100, providing maintenance performed information, providing firmware version information, receiving firmware updates and reprogramming, and providing motor 224 operation/fault status information to a diagnostic/monitoring device, or the like.

The controller 206 and/or components of controller 206 may be integrated or incorporated within other components of the appliance 100. In some embodiments, for example, controller 206 may be incorporated within the vacuum suction unit 204 or the motor assembly.

The power source 208 is configured to supply electrical power to components of the appliance 100, such as the motor 224 and the controller 206, and may generally include any suitable power source that enables the appliance 100 to operate as described herein. Suitable types of power sources include, for example and without limitation, DC power sources, such as battery packs, and AC power sources, such as mains AC electricity from a household or commercial wall outlet.

The illustrated appliance 100 is a "cordless" vacuum cleaner that includes a portable power source, shown in the form of a battery pack 118 removably connected to a battery receptacle 120 defined by the housing 202. The battery pack 118 of the example embodiment is a direct current (DC) source battery configured to supply direct current to the appliance 100. The battery pack 118 may have any suitable DC battery construction that enables the appliance 100 to function as described herein. For example, the battery may include, without limitation, one or more lithium-ion batteries, nickel-metal hydride batteries, lead-acid batteries, lithium-metal batteries, supercapacitors or other capacitor-based voltage sources, lithium nickel manganese cobalt oxide batteries, lithium nickel cobalt aluminum oxide batteries, and any other suitable DC battery construction that enables the appliance 100 to function as described herein. In this embodiment, the battery pack 118 is a rechargeable lithium-ion battery that includes a plurality of lithium-ion cells.

The appliance 100 may also include a power cord (not shown) for supplying AC power, converted to DC, to charge the battery, to supply power to operate the motor 224, and/or to power other operational components of the appliance 100. Thus, the appliance 100 may be selectively operated in a cordless mode, in which the battery pack 118 is electrically connected to the appliance 100, and a corded mode, in which a power cord is electrically connected to the appliance 100 and supplies AC power to the appliance 100 (e.g., from a wall outlet). Other embodiments may be operated only from a battery or only from AC power.

Figure 4:
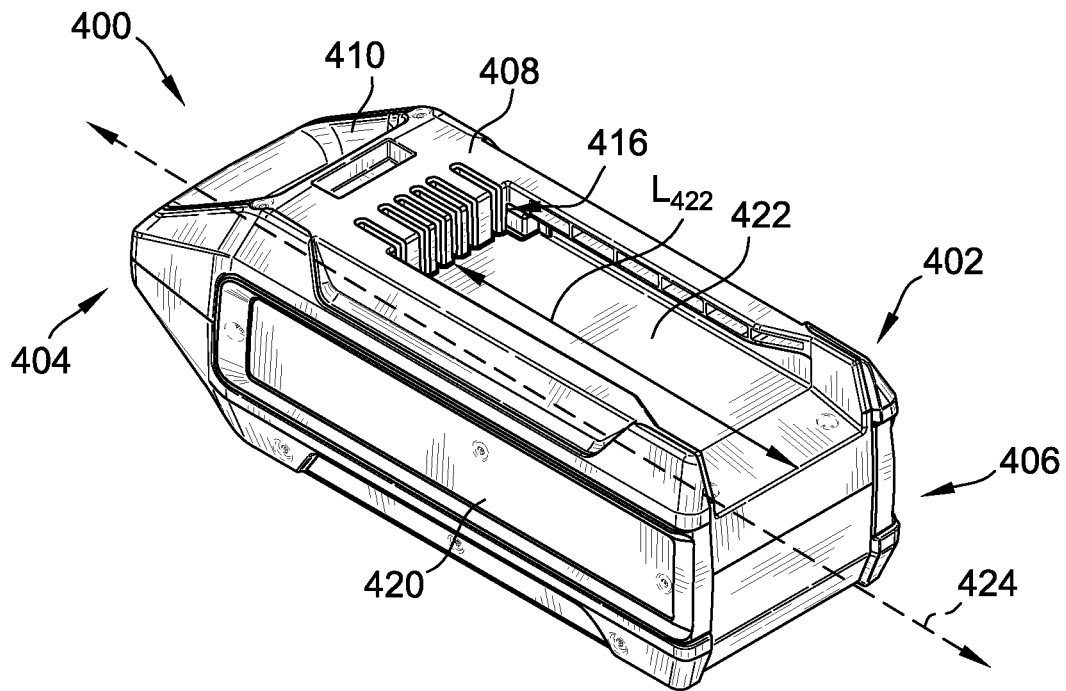
FIG. 4 is a perspective view of a first battery pack suitable for use with battery-powered appliance shown in FIG. 1.
Figure 5:
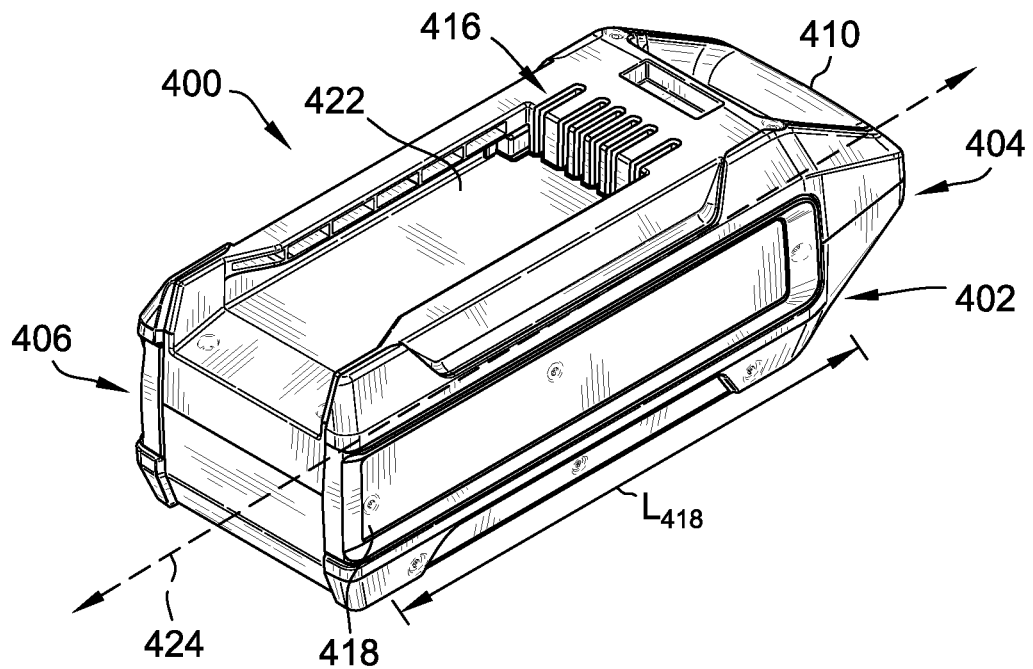
FIG. 5 is another perspective view of the first battery pack shown in FIG. 4.
Figure 6:
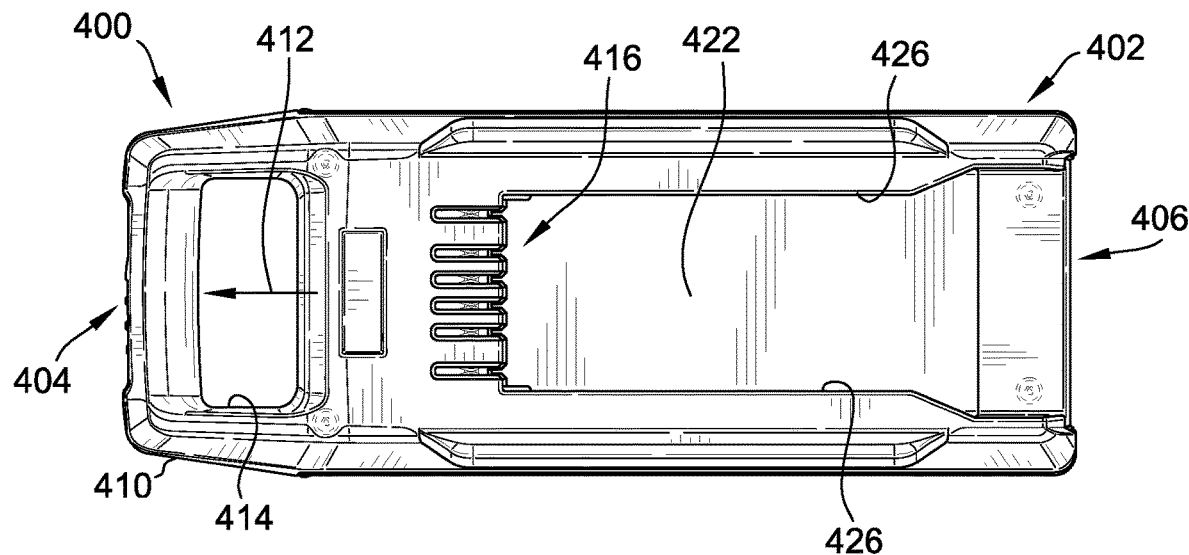
FIG. 6 is a side view of the first battery pack shown in FIG. 4.
Figure 7:
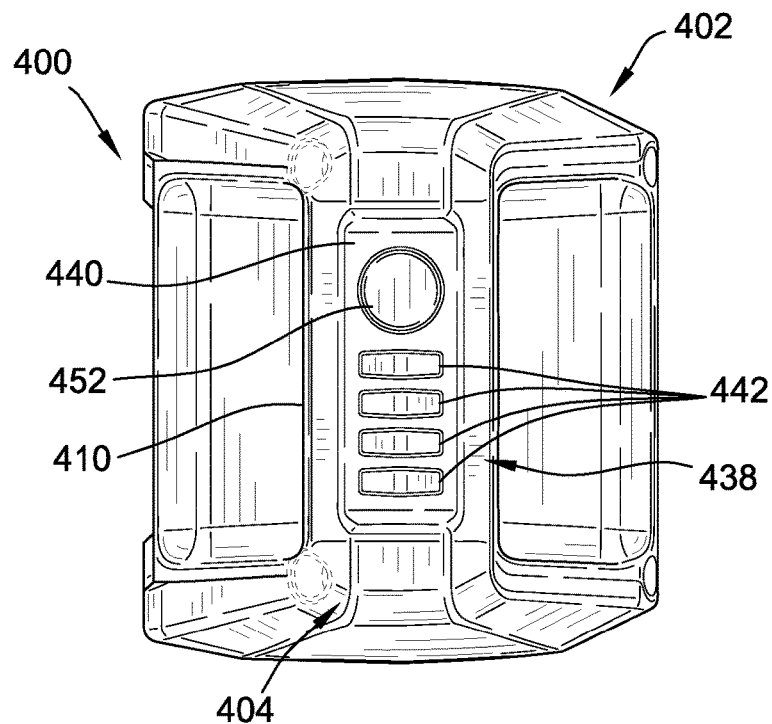
FIG. 7 is an end view of a first end of the first battery pack shown in FIG. 4.
Figure 8:
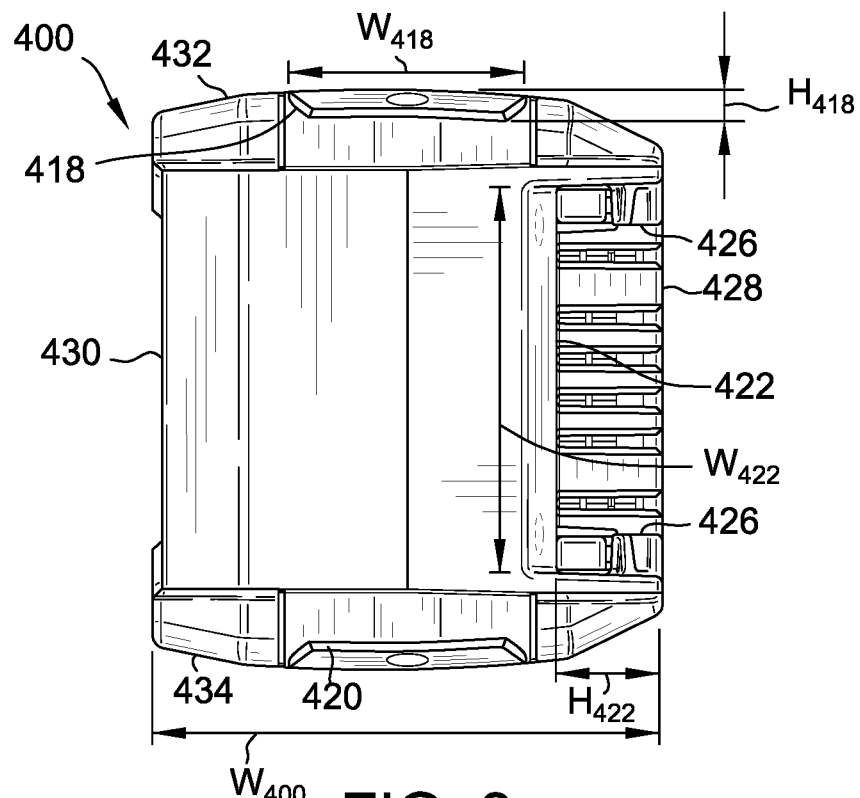
FIG. 8 is an end view of a second end of the first battery pack shown in FIG. 5.
Figure 9:
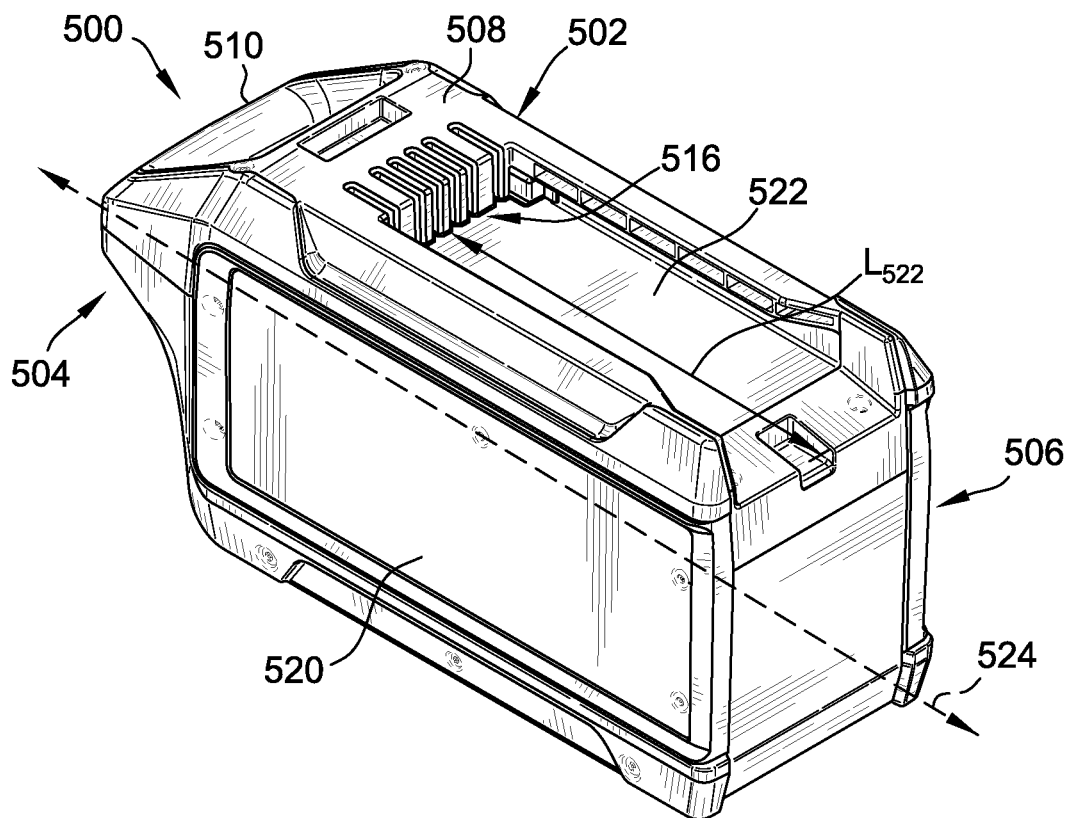
FIG. 9 is a perspective view of a second battery pack suitable for use with the battery-powered appliance shown in FIG. 1.
Figure 10:
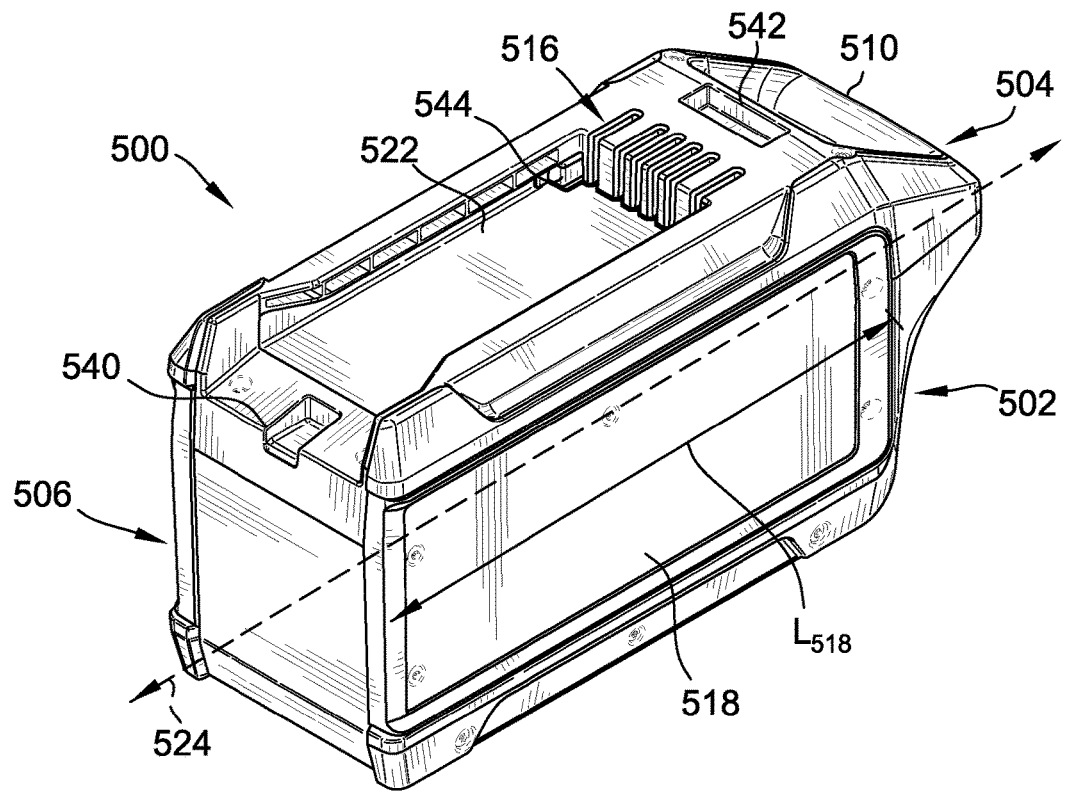
FIG. 10 is another perspective view of the second battery pack shown in FIG. 9.
Figure 11:
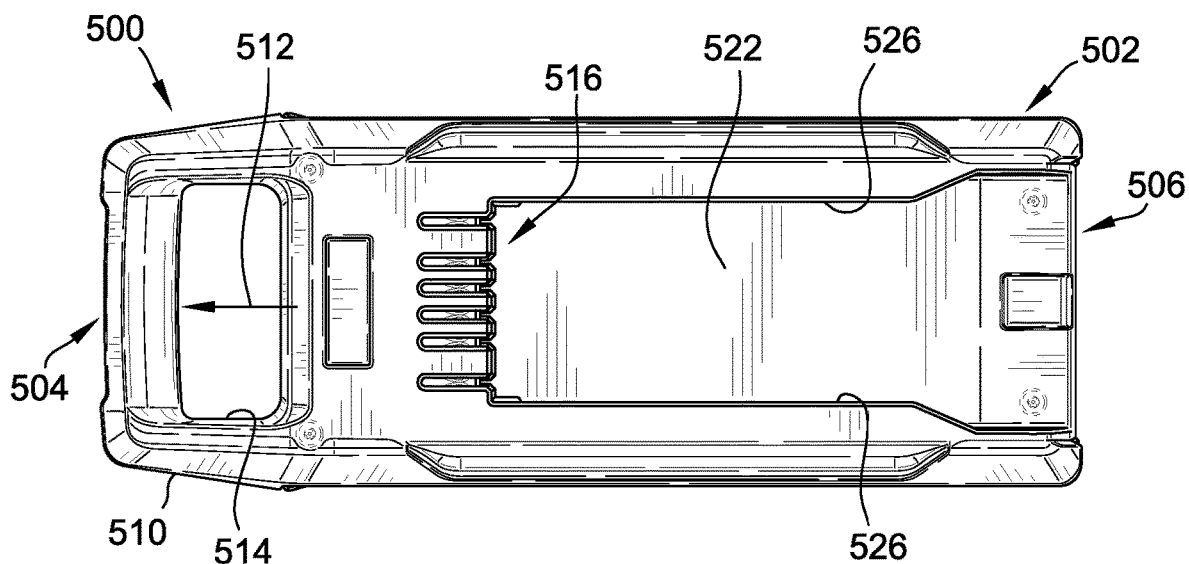
FIG. 11 is a side view of the second battery pack shown in FIG. 9.
Figure 12:
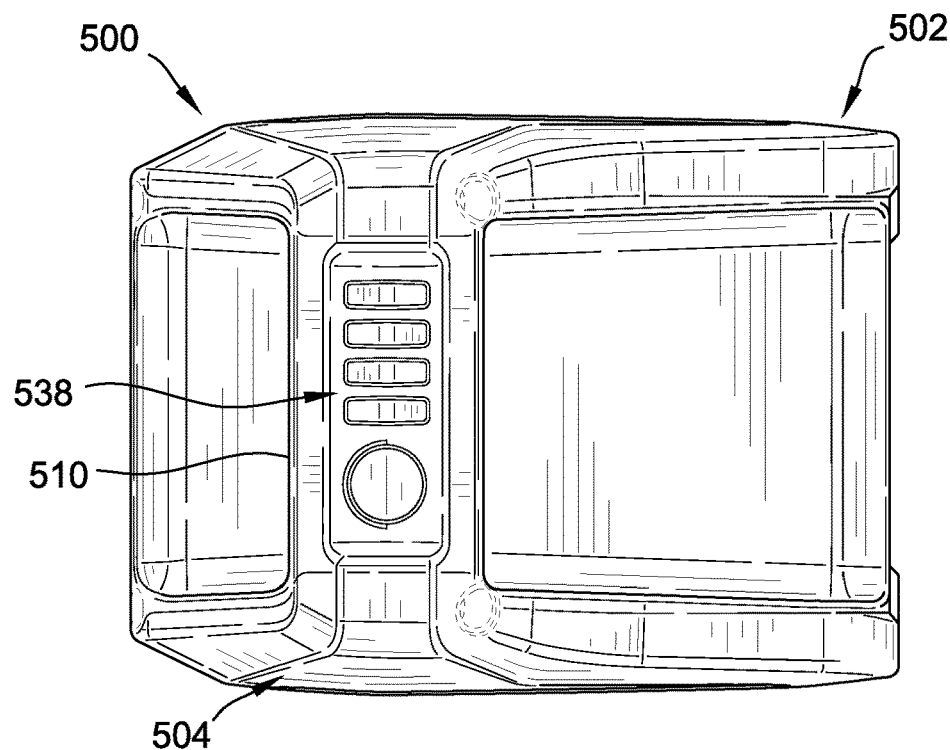
FIG. 12 is an end view of a first end of the second battery pack shown in FIG. 9.
Figure 13:
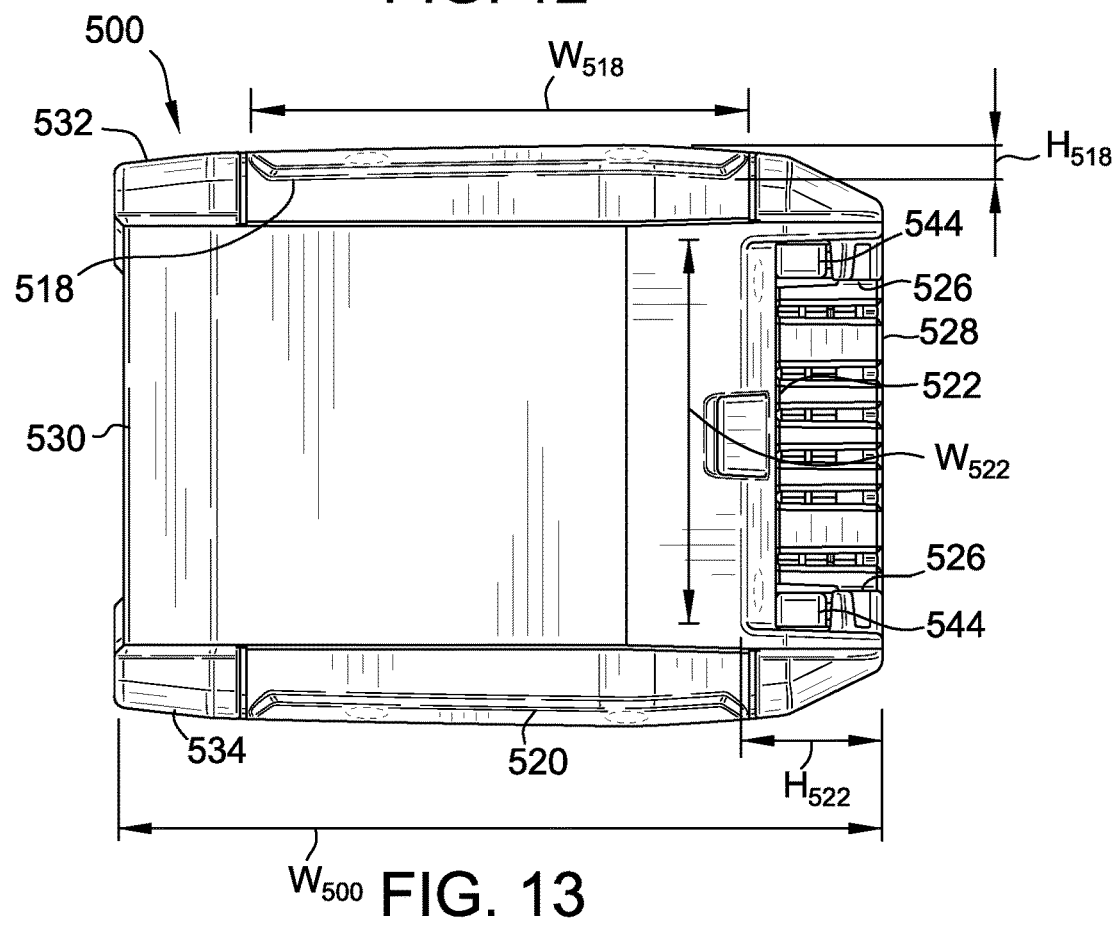
FIG. 13 is an end view of a second end of the second battery pack shown in FIG. 9.

FIGS. 4-13 are various views of first and second battery packs 400, 500 suitable for use as the battery pack 118 of FIG. 1. FIG. 4 is a perspective view of the first battery pack 400, FIG. 5 is another perspective view of the first battery pack 400, FIG. 6 is a side view of the first battery pack 400, FIG. 7 is an end view of a first end of the first battery pack 400, and FIG. 8 is an end view of a second end of the first battery pack 400. FIG. 9 is a perspective view of the second battery pack 500, FIG. 10 is another perspective view of the second battery pack 500, FIG. 11 is a side view of the second battery pack 500, FIG. 12 is an end view of a first end of the second battery pack 500, and FIG. 13 is an end view of a second end of the second battery pack 500.

The first and second battery packs 400, 500 are DC source batteries configured to supply direct current to the appliance 100. The first and second battery packs 400, 500 may have any suitable DC battery construction that enables the appliance 100 to function as described herein, including any of the DC battery constructions described above. Additionally, the first battery pack 400 and the second battery pack 500 may have any suitable output or operating voltage that enables the appliance 100 to function as described herein. In some embodiments, for example, the battery 104 has a DC output voltage of between 12 volts DC (VDC) and 140 VDC, between 18 VDC and 140 VDC, between 30 VDC and 140 VDC, between 30 VDC and 110 VDC, between 30 VDC and 70 VDC, between 36 VDC and 140 VDC, between 36 VDC and 110 VDC, between 36 VDC and 70 VDC, between 36 VDC and 65 VDC, between 50 VDC and 140 VDC, between 80 VDC and 140 VDC, between 90 VDC and 130 VDC, between 90 VDC and 120 VDC, between 100 VDC and 120 VDC, or between 90 VDC and 110 VDC. In the example embodiment, the first and second battery packs 400, 500 have the same DC output voltage, although the first battery pack 400 and the second battery pack 500 may have different output voltages in other embodiments.

In the example embodiment, the second battery pack 500 has a greater power capacity (e.g., Amp-hours (Ah)) than the first battery pack 400 and, as shown in FIGS. 7 and 12, for example, has a generally larger profile (e.g., greater width) than the first battery pack 400 to accommodate additional components (e.g., battery cells) for a greater power capacity.

In some embodiments, the second battery pack 500 has a power capacity between 1.5 to 2.5 times greater than the first battery pack 400. The first and second battery packs 400, 500 may have any suitable power capacity that enables the appliance 100 to function as described herein. In one embodiment, the first battery pack has a power capacity of 6 Ah, and the second battery pack has a power capacity of 12 Ah. In another embodiment, the first battery pack has a power capacity of 4 Ah, and the second battery pack has a power capacity of 8 Ah. In another embodiment, the first battery pack has a power capacity in the range of 3 Ah to 8 Ah, and the second battery pack has a power capacity in the range of 6 Ah to 16 Ah.

As described further herein, the battery receptacle 120 of the appliance 100 is configured to accommodate and separately receive each of the first battery pack 400 and the second battery pack 500 such that battery packs with different power capacities and sizes can be used with the appliance 100. Additionally, embodiments of the battery receptacle 120 and first and second battery packs 400, 500 collectively form a battery pack connection system that facilitates insertion and connection of each of the first battery pack 400 and the second battery pack 500 into the battery receptacle 120. Embodiments of the present disclosure facilitate "blind" insertion of battery packs into the battery receptacle 120—i.e., inserting a battery pack into the battery receptacle 120 without looking or being able to see the battery pack or the battery receptacle 120. This configuration is particularly suited for battery-powered appliances that are secured to a user's back, such as backpack vacuum cleaners, blowers, sprayers, etc., where a user is unable to see the battery receptacle while the appliance is secured to the user. Embodiments of the present disclosure thereby facilitate switching or exchanging battery packs without having to remove the appliance from the user's back, also referred to as "hot-swapping".

Referring to FIGS. 4-8, the first battery pack 400 includes a housing 402 extending longitudinally from a first end 404 to a second end 406. The housing 402 includes a main body 408 and a handle 410 located at the first end 404 of the housing 402 end and extending from the main body 408 in a first direction, indicated by arrow 412 in FIG. 6. The handle 410 defines an aperture 414 sized and shaped to receive one or more of a user's fingers therein to facilitate grasping and handling the first battery pack 400.

The first battery pack 400 also includes an electrical connector 416 that is sized and shaped complementary to an electrical receptacle 602 (FIG. 14) of the battery receptacle 120 such that the first battery pack 400 is mechanically and electrically connectable to the electrical receptacle 602 of the battery receptacle 120. The electrical connector 416 includes a plurality of electrical contacts (not labeled in FIGS. 4-8) that connect to corresponding electrical contacts of the electrical receptacle 602 of the battery receptacle 120. Suitable electrical contacts include, for example and without limitation, clips, clamps, pads, prongs, leads, and combinations thereof. The electrical contacts are electrically connected to at least one battery cell 450 (FIG. 19) enclosed within an internal cavity 446 (FIG. 19) defined by the first battery pack housing 402 to supply electrical power therefrom through the electrical contacts.

The first battery pack 400 also includes a plurality of guide sections to facilitate insertion and connection of the first battery pack 400 into the battery receptacle 120. Specifically, in the illustrated embodiment, the first battery pack 400 includes a first guide slot 418, a second guide slot 420, and an electrical connector slot 422 that includes the electrical connector 416 at a terminal end thereof.

Each of the first guide slot 418, the second guide slot 420, and the electrical connector slot 422 extends longitudinally from the second end 406 of the first battery pack housing 402 towards the first end 404 of the first battery pack housing 402, and terminates prior to the first end 404 of the first battery pack housing 402. Each of the first guide slot 418, the second guide slot 420, and the electrical connector slot 422 is open at the second end of the first battery pack housing 402 to receive a corresponding rail of the battery receptacle 120 (described further herein). Additionally, each of the first guide slot 418, the second guide slot 420, and the electrical connector slot 422 is sized and shaped complementary to the corresponding rail of the battery receptacle 120 to facilitate engagement therewith.

The first guide slot 418 has a length $L_{418}$ extending in the longitudinal direction 424, a width $W_{418}$ extending in a direction oriented perpendicular to the length $L_{418}$, and a height $H_{418}$ extending in a direction oriented perpendicular to both the length $L_{418}$ and the width $W_{418}$. The second guide slot 420 also has a length, a width, and a height, which are identical to the dimensions of the first guide slot 418 in the illustrated embodiment, and therefore not labeled. In other embodiments, one or more dimensions of the second guide slot 420 may be different from those of the first guide slot 418.

The electrical connector slot 422 has a length $L_{422}$ extending in the longitudinal direction 424, a width $W_{422}$ extending in a direction oriented perpendicular to the length $L_{422}$, and a height $H_{422}$ extending in a direction oriented perpendicular to both the length $L_{422}$ and the width $W_{422}$. In the illustrated embodiment, the electrical connector slot length $L_{422}$ is less than the length of each of the first guide slot 418 and the second guide slot 420. As described further herein, the respective lengths of each slot is sized complementary to a corresponding rail of the battery receptacle 120, and the longer length of the first and second guide rails facilitates engaging guide rails of the battery receptacle 120, during insertion, with the first and second guide slots 418, 420 prior to an electrical connection rail of the battery receptacle 120 engaging the electrical connector slot 422.

The first battery pack housing 402 of the illustrated embodiment also includes a pair of opposing side rails 426 that extend laterally inwards into the electrical connector slot 422. The side rails 426 are sized and shaped complementary to corresponding slots of the battery receptacle 120 to facilitate securing the first battery pack housing 402 within the battery receptacle 120.

As shown in FIG. 8, the first battery pack 400 of the illustrated embodiment has a generally rectangular or pseudo-rectangular cross-section within a plane oriented perpendicular to the longitudinal direction 424. The first battery pack housing 402 includes a first side 428, an opposing second side 430, a third side 432 (also referred to as a "top" of the housing 402) extending between the first side 428 and the second side 430, and a fourth side 434 (also referred to as a "bottom" of the housing 402) opposite the top 432 and extending between the first side 428 and the second side 430. The top 432 and bottom 434 are oriented generally parallel to one another and perpendicular to each of the first side 428 and the second side 430.

In the illustrated embodiment, the first guide slot 418 is defined along the top 432 of the housing 402, the second guide slot 420 is defined along the bottom 434 of the housing 402, and the electrical connector slot 422 is defined along the first side 428 of the housing 402. In other embodiments, the first guide slot 418, the second guide slot 420, and the electrical connector slot 422 may be located at any suitable position on the first battery pack housing 402 that enables the first battery pack 400 to function as described herein.

The second battery pack 500 has a configuration substantially similar to that of the first battery pack 400, except the second battery pack 500 has a greater capacity and generally larger profile (e.g., a greater width) than the first battery pack 400, as noted above.

In particular, the second battery pack 500 includes a housing 502 extending longitudinally from a first end 504 to a second end 506. The housing 502 includes a main body 508 and a handle 510 located at the first end 504 of the housing 502 end and extending from the main body 508 in a first direction, indicated by arrow 512 in FIG. 11. The handle 510 defines an aperture 514 sized and shaped to receive one or more of a user's fingers therein to facilitate grasping and handling the second battery pack 500.

The second battery pack 500 also includes an electrical connector 516 that is sized and shaped complementary to the electrical receptacle 602 (FIG. 14) of the battery receptacle 120 such that the second battery pack 500 is mechanically and electrically connectable to the electrical receptacle 602 of the battery receptacle 120. The electrical connector 516 includes a plurality of electrical contacts (not labeled in FIGS. 9-13) that connect to corresponding electrical contacts of the electrical receptacle 602 of the battery receptacle 120. Suitable electrical contacts include, for example and without limitation, clips, clamps, pads, prongs, leads, and combinations thereof. The electrical contacts are electrically connected to at least one battery cell enclosed within an internal cavity (not shown in FIGS. 9-13) defined by the second battery pack housing 502 to supply electrical power therefrom through the electrical contacts.

The second battery pack 500 also includes a plurality of guide sections to facilitate insertion and connection of the second battery pack 500 into the battery receptacle 120. Specifically, in the illustrated embodiment, the second battery pack 500 includes a first guide slot 518, a second guide slot 520, and an electrical connector slot 522 that includes the electrical connector 516 at a terminal end thereof.

Each of the first guide slot 518, the second guide slot 520, and the electrical connector slot 522 extends longitudinally from the second end 506 of the second battery pack housing 502 towards the first end 504 of the second battery pack housing 502, and terminates prior to the first end 504 of the second battery pack housing 502. Each of the first guide slot 518, the second guide slot 520, and the electrical connector slot 522 is open at the second end 506 of the second battery pack housing 502 to receive a corresponding rail of the battery receptacle 120 (described further herein). Additionally, each of the first guide slot 518, the second guide slot 520, and the electrical connector slot 522 is sized and shaped complementary to the corresponding rail of the battery receptacle 120 to facilitate engagement therewith.

The first guide slot 518 has a length $L_{518}$ extending in the longitudinal direction 524, a width $W_{518}$ extending in a direction oriented perpendicular to the length $L_{518}$, and a height $H_{518}$ extending in a direction oriented perpendicular to both the length $L_{518}$ and the width $W_{518}$. The second guide slot 520 also has a length, a width, and a height, which are identical to the dimensions of the first guide slot 518 in the illustrated embodiment, and therefore not labeled. In other embodiments, one or more dimensions of the second guide slot 520 may be different from those of the first guide slot 518.

In some embodiments, such as the embodiments illustrated in FIGS. 4-13, the width $W_{518}$ of the guide slots 518, 520 on second battery pack 500 may be greater than width $W_{418}$ of the guide slots 418, 420 on the first battery pack 400. For example, where the second battery pack 500 substantially fills or occupies the battery receptacle 120, the guide slots 518, 520 of second battery pack 500 may be wider to provide more play or tolerance to make insertion of the second battery pack 500 easier because the size and shape of the battery receptacle 120 will have a natural tendency to align the second battery pack 500 with the battery receptacle 120. The narrower guide slots 418, 420 of the smaller first battery pack 400 ensure proper alignment and prevent or inhibit movement, shifting, and/or misalignment of the first battery pack 400 in a direction perpendicular to the insertion direction.

The electrical connector slot 522 of the second battery pack 500 has a length $L_{522}$ extending in the longitudinal direction 524, a width $W_{522}$ extending in a direction oriented perpendicular to the length $L_{522}$, and a height $H_{522}$ extending in a direction oriented perpendicular to both the length $L_{522}$ and the width $W_{522}$. In the illustrated embodiment, the electrical connector slot length $L_{522}$ is less than the length of each of the first guide slot 518 and the second guide slot 520. As described further herein, the respective lengths of each slot is sized complementary to a corresponding rail of the battery receptacle 120, and the longer length of the first and second guide slots 518, 520 facilitates engaging guide rails of the battery receptacle 120, during insertion, with the first and second guide slots 518, 520 prior to an electrical connection rail of the battery receptacle 120 engaging the electrical connector slot 522.

The second battery pack housing 502 of the illustrated embodiment also includes a pair of opposing side rails 526 that extend laterally inwards into the electrical connector slot 522. The side rails 526 are sized and shaped complementary to corresponding slots of the battery receptacle to facilitate securing the second battery pack housing 502 within the battery receptacle 120.

As shown in FIG. 13, the second battery pack 500 of the illustrated embodiment has a generally rectangular or pseudo-rectangular cross-section within a plane oriented perpendicular to the longitudinal direction 524. The second battery pack housing 502 includes a first side 528, an opposing second side 530, a third side 532 (also referred to as a "top" of the housing 502) extending between the first side 528 and the second side 530, and a fourth side 534 (also referred to as a "bottom" of the housing 502) opposite the top 532 and extending between the first side 528 and the second side 530. The top 532 and bottom 534 are oriented generally parallel to one another and perpendicular to each of the first side 528 and the second side 530.

In the illustrated embodiment, the first guide slot 518 is defined along the top 532 of the housing 502, the second guide slot 520 is defined along the bottom 534 of the housing 502, and the electrical connector slot 522 is defined along the first side 528 of the housing 502. In other embodiments, the first guide slot 518, the second guide slot 520, and the electrical connector slot 522 may be located at any suitable position on the second battery pack housing 502 that enables the second battery pack 500 to function as described herein.

With reference to FIGS. 8 and 13, the first battery pack 400 has a width $W_{400}$ measured from the first side 428 to the second side 430, and the second battery pack 500 has a width $W_{500}$ measured from the first side 528 to the second side 530. The second battery pack width $W_{500}$ is greater than the first battery pack width $W_{400}$ in the illustrated embodiment because the second battery pack 500 has a greater power capacity (and therefore larger and/or a greater number of battery cells) than the first battery pack 400. The battery receptacle 120 is sized and shaped to separately receive each of the first battery pack 400 and the generally larger second battery pack 500.

The first and second battery packs 400, 500 have a common cross-sectional profile in a plane oriented perpendicular to the longitudinal direction, as shown in FIGS. 8 and 13. The common cross-sectional profile of the first and second battery packs 400, 500 is shaped complementary to a portion of the battery receptacle 120 (e.g., a keyed section 614 of the battery receptacle 120, described further herein) to facilitate alignment and insertion of each of the first and second battery packs 400, 500 into the battery receptacle 120.

The first and second battery packs 400, 500 can include other features to facilitate connecting and disconnecting the first and second battery packs 400, 500 from the battery receptacle 120. As illustrated in FIG. 10, for example, the second battery pack 500 of the illustrated embodiment includes a keyed lockout feature 540, a latch-receiving slot 542, and ejector pins 544 (one visible in FIG. 10).

The keyed lockout feature 540 is sized and shaped complementary to a corresponding keyed feature (not shown) of the battery receptacle 120 to permit only certain battery packs to connect to the battery receptacle 120. In some embodiments, for example, the appliance 100 may require a battery with certain characteristics (e.g., a certain battery voltage or ampacity) for proper operation. In such embodiments, battery packs that have the required characteristics can include the keyed lockout feature 540 such that the battery packs can be inserted into and connected to the receptacle 120. Battery packs that do not include the keyed lockout feature 540 will be prevented from being fully inserted into and connected to the receptacle 120 because the keyed feature of the receptacle 120 will engage the housing of the battery pack and inhibit full insertion of the battery pack. In the illustrated embodiment, the keyed lockout feature 540 is a rectangular notch or recess defined in the housing 502 at the second end 506 of the housing 502 adjacent the electrical connector slot 522. In other embodiments, the keyed lockout feature can have any other suitable size, shape, configuration, and position that enables the battery packs to function as described herein. Moreover, although only the second battery pack 500 is illustrated with the keyed lockout feature 540, the first battery pack 400 may also include a keyed lockout feature 540.

The latch-receiving slot 542 is sized, shaped, and positioned to receive a depressible latch 632 (shown in FIGS. 14 and 15) of the battery receptacle 120 to retain the battery pack 500 within the battery receptacle 120. The latch-receiving slot 542 is positioned on the same side of the battery pack 500 as the electrical connector slot 522 in the illustrated embodiment, although in other embodiments the latch-receiving slot 542 may be positioned at any suitable location on the battery pack 500 that enables the battery pack 500 to function as described herein. The latch-receiving slot 542 is generally sized and shaped to cooperatively engage the latch 632 of the battery receptacle 120 to prevent the battery pack 500 from being removed from the battery receptacle 120 without the latch 632 being first disengaged. The latch-receiving slot 542 of the example embodiment is rectangular, although the latch-receiving slot 542 can have any other suitable shape that enables the battery pack 500 to function as described herein, including, for example and without limitation, square, triangular, polygonal, round, elliptical, or circular.

The ejector pins 544 are configured to facilitate removal of the battery pack 500 from the battery receptacle 120. More specifically, the ejector pins 544 bias or urge the battery pack 500 out of the battery receptacle 120 when the battery pack 500 is connected to the battery receptacle 120 such that, when the latch 632 is disengaged from the battery pack 500, the ejector pins 544 force or urge the battery pack 500 out of the battery receptacle 120 so less force is required from a user to remove the battery pack 500 from the battery receptacle 120.

Each ejector pin 544 of the example embodiment is a spring-loaded pin that is biased towards a first or undepressed position (shown in FIG. 10) by a spring (not shown) compressed between the ejector pin 544 and a portion of the battery pack housing 502. The ejector pins 544 are positioned to engage a portion of the battery receptacle 120, when the battery pack 500 is connected to the battery receptacle 120, that causes the ejector pins 544 to be depressed to a second or depressed position (not shown). In this position, the ejector pins 544 engage and press against a portion of the battery receptacle 120 to bias or urge the battery pack 500 out of the battery receptacle 120. The force exerted by the ejector pins 544 on the battery receptacle 120 reduces the amount of user-applied force needed to remove the battery pack from the battery receptacle 120 when the latch 632 is disengaged from the battery pack 500. In some embodiments, the force from the ejector pins 544 can be sufficient to advance the battery pack 500 at least partially out of the battery receptacle 120 when the latch 632 is disengaged from the battery pack 500.

In the illustrated embodiment, the battery pack 500 includes two ejector pins 544 located on opposite sides of the electrical connector slot 522. In other embodiments, the battery pack 500 can include more than or less than two ejector pins 544, and the ejector pins 544 can be located at any other suitable location on the battery pack 500 that enables the battery pack 500 to function as described herein.

The first battery pack 400 can include the same or similar latch-receiving slot 542 and ejector pins 544 as the second battery pack 500 as shown, for example, in FIGS. 5 and 8.

Referring again to FIG. 1, the battery receptacle 120 of the illustrated embodiment is located at a bottom or base of the appliance housing 202, though it should be understood that the battery receptacle 120 may be located at any suitable portion of the appliance housing 202 that enables the appliance 100 to function as described herein. Further, in the example embodiment, the battery receptacle 120 is oriented to receive a battery pack (e.g., first battery pack 400 and second battery pack 500), when positioned on a user's back, in an insertion direction from right to left, as indicated by arrow 122 in FIG. 1. In other embodiments, the battery receptacle 120 may be configured to receive a battery pack in any suitable direction that enables the appliance 100 to function as described herein.

Figure 14:
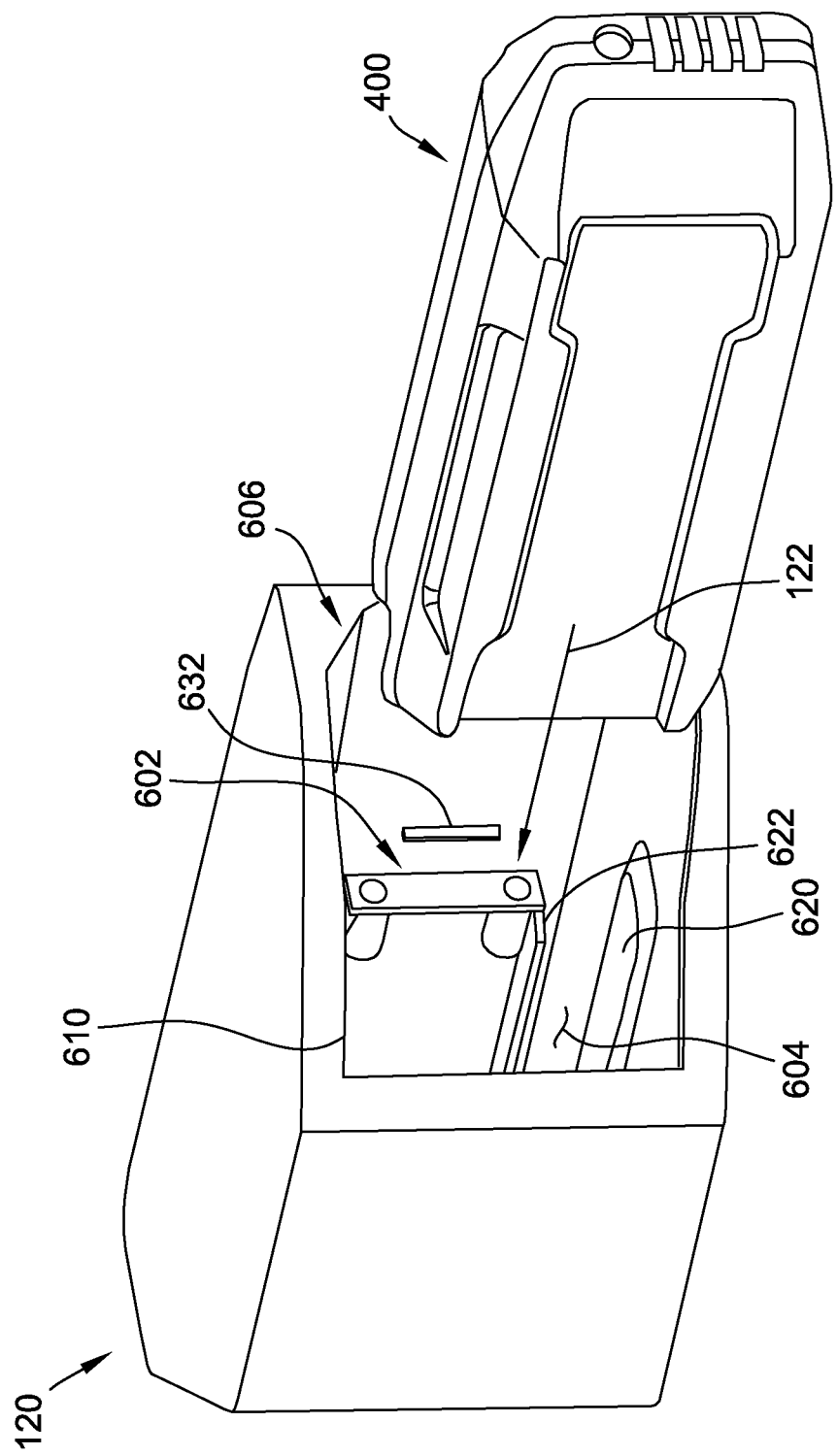
FIG. 14 is a perspective view of a battery receptacle of the battery-powered appliance shown in FIG. 1.
Figure 15:
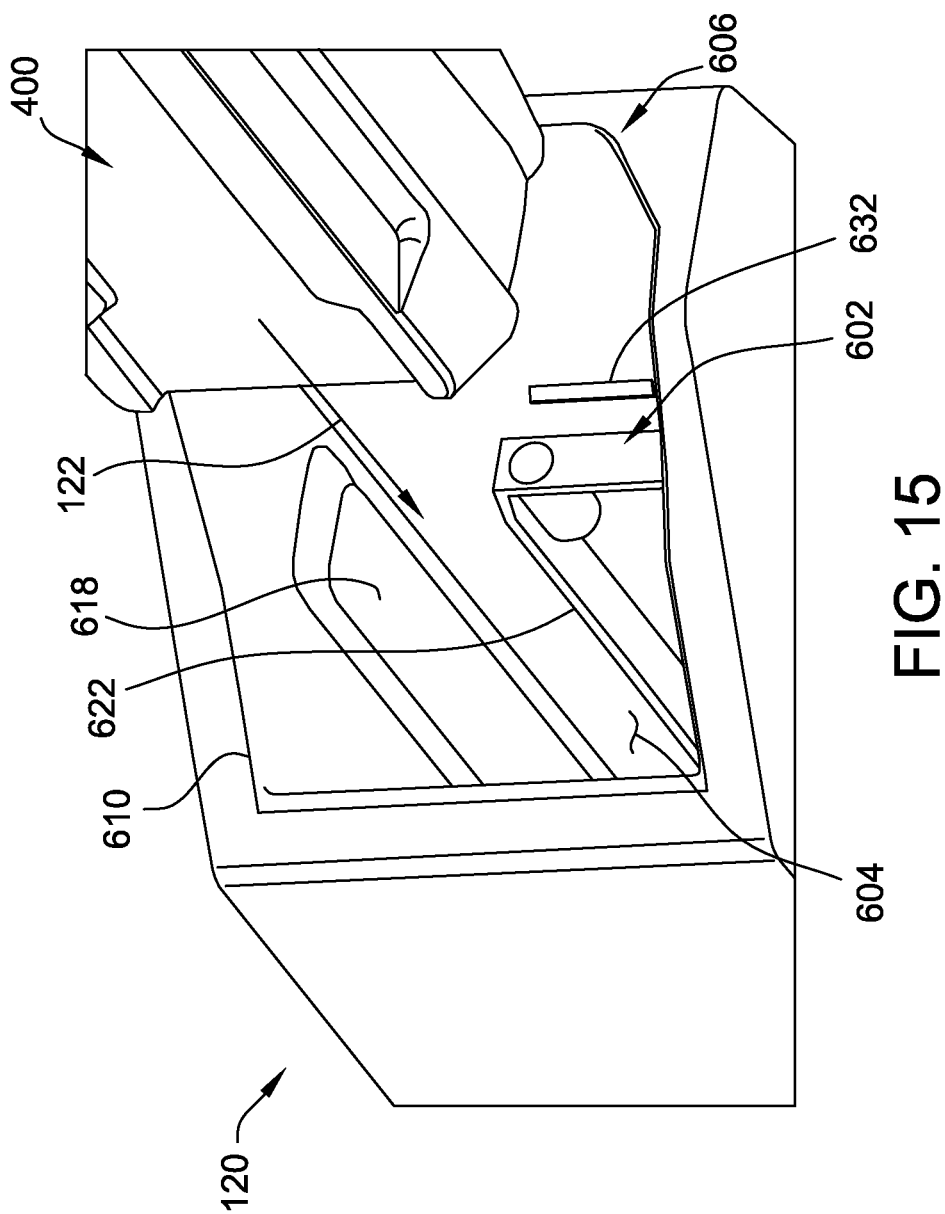
FIG. 15 is another perspective view of the battery receptacle shown in FIG. 14.

FIG. 14 is a perspective view of the battery receptacle 120 of FIG. 1, illustrating the first battery pack 400 being inserted into the battery receptacle 120. FIG. 15 is another perspective view of the battery receptacle 120, FIG. 16 is an end view of the battery receptacle 120 from an insertion end of the battery receptacle 120, FIG. 17 is an end view of the battery receptacle 120 from a terminal end of the battery receptacle 120, and FIG. 18 is a side view of the battery receptacle 120.

The battery receptacle 120 includes an electrical receptacle 602 that electrically connects to the electrical connector 416, 516 of each of the first and second battery packs 400, 500. The electrical receptacle 602 includes a plurality of electrical contacts (not shown in FIGS. 14-18) that connect to corresponding electrical contacts of the electrical connectors 416, 516 of the first and second battery packs 400, 500. Suitable electrical contacts include, for example and without limitation, clips, clamps, pads, prongs, leads, and combinations thereof. The electrical contacts of the electrical receptacle 602 are electrically connected, directly or indirectly, to an electrical load of the appliance 100 (e.g., motor 224, controller 206) to supply electrical power from one of the first and second battery packs 400, 500.

Figure 16:
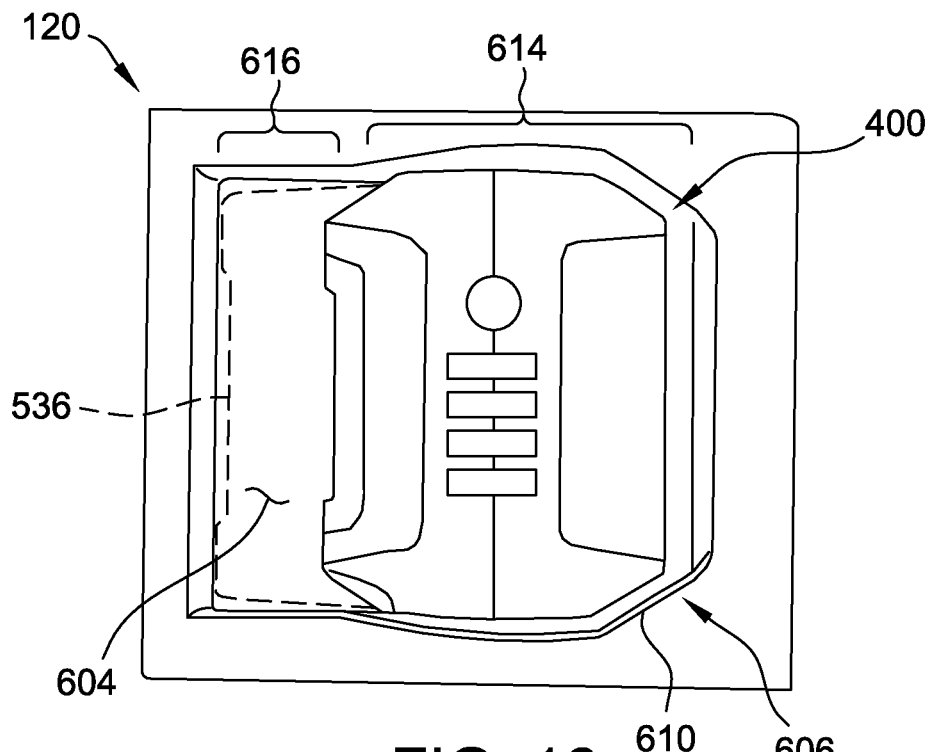
FIG. 16 is an end view of the battery receptacle shown in FIG. 14, viewed from an insertion end of the battery receptacle.
Figure 17:
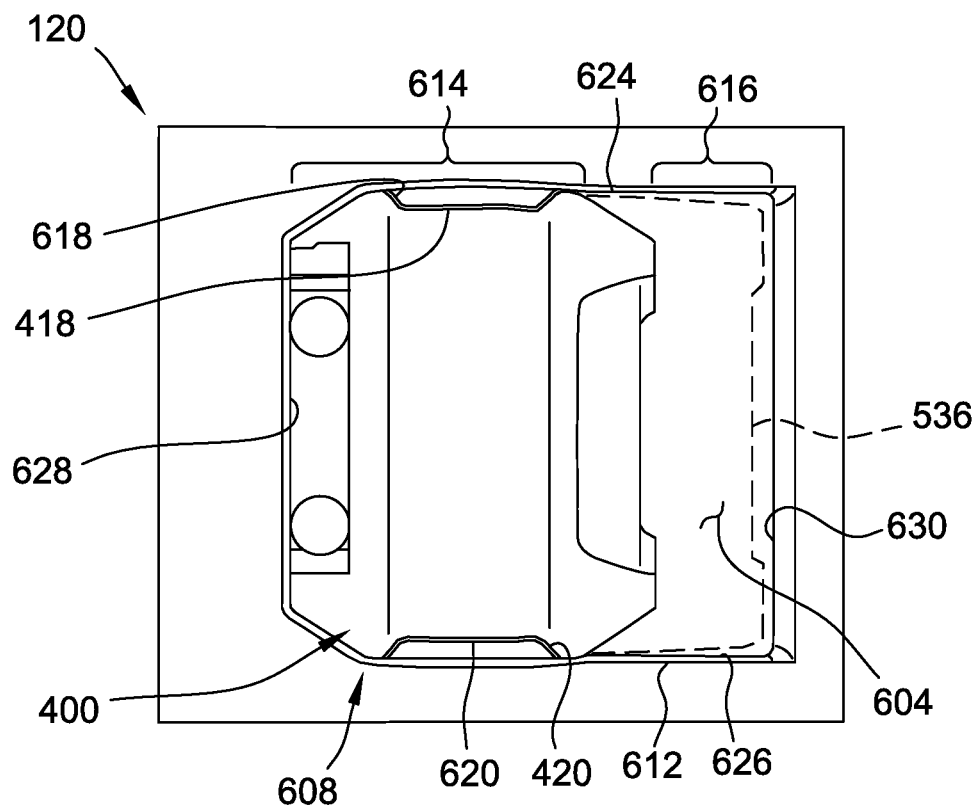
FIG. 17 is an end view of the battery receptacle shown in FIG. 14, viewed from a terminal end of the battery receptacle.
Figure 18:
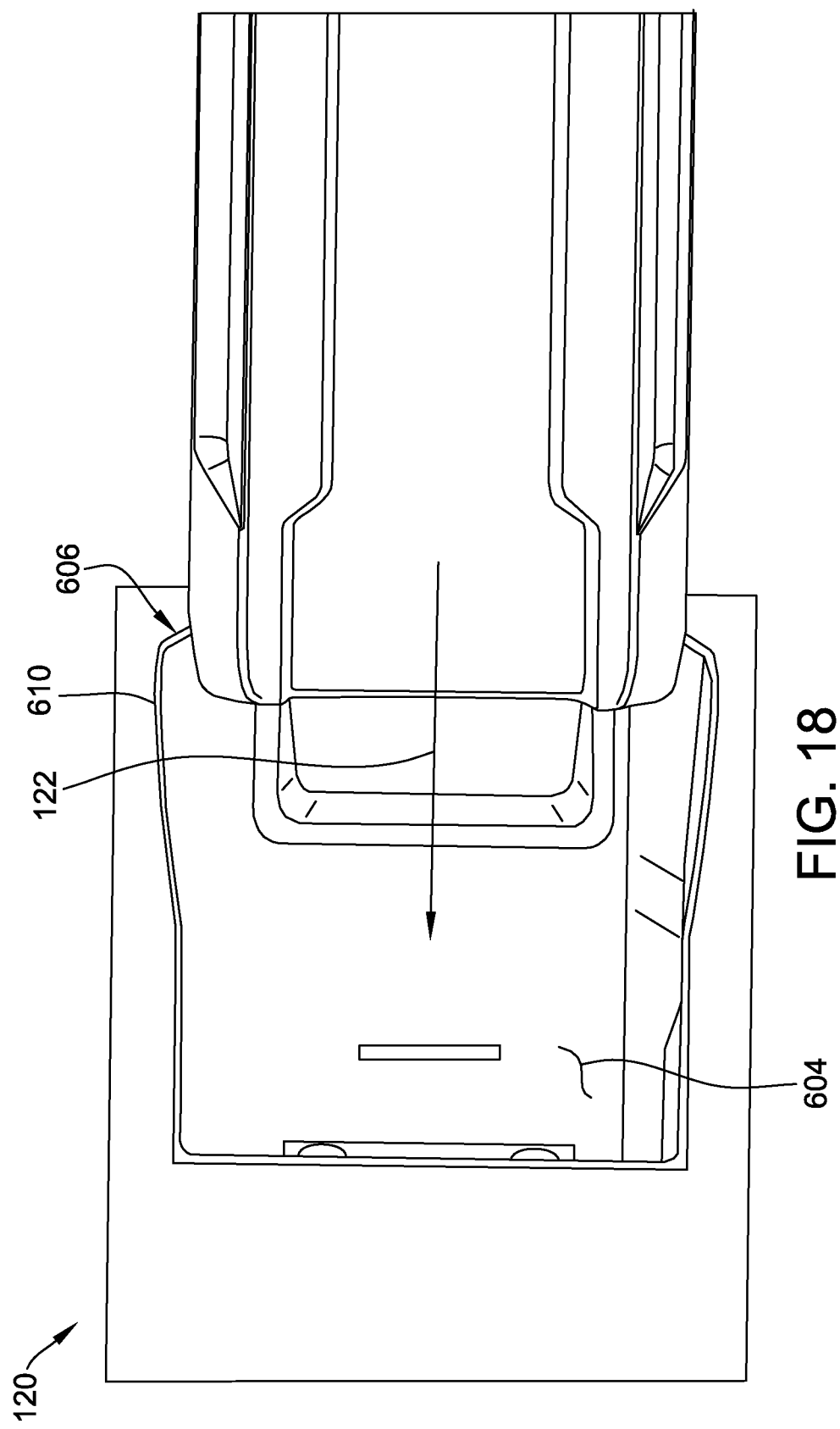
FIG. 18 is a side view of the battery receptacle shown in FIG. 14.

As illustrated in FIGS. 14-18, the battery receptacle 120 defines an elongate passage 604 that extends longitudinally from an insertion end 606 to a terminal end 608. The battery receptacle 120 defines an insertion opening 610 at the insertion end 606, and a terminal opening 612 at the terminal end 608. The elongate passage 604 is sized and shaped to separately receive each of the first and second battery packs 400, 500 therein. For example, the battery receptacle 120 includes a keyed section 614 having a cross-sectional profile shaped complementary to the common cross-sectional profile (e.g., pseudo-rectangular) of the first and second battery packs 400, 500. Additionally, the battery receptacle 120 includes a reserve section 616 that is sized and shaped to receive or accommodate a portion 536 (e.g., a widthwise extension) of the second battery pack 500 therein, indicated by broken lines in FIGS. 16 and 17. Thus, the reserve section 616 of the battery receptacle 120 is unoccupied by the first battery pack 400 when the first battery pack 400 is connected to the electrical receptacle 602, as shown in FIGS. 16 and 17, and is occupied by a portion of the second battery pack 500 (e.g., a widthwise extension 536) when the second battery pack 500 is connected to the electrical receptacle 602.

The battery receptacle 120 also includes a plurality of guide sections that cooperatively engage the guide sections of the first and second battery packs 400, 500 to facilitate insertion of the first and second battery packs 400, 500 into the elongate passage 604.

Specifically, the battery receptacle 120 includes a first guide rail 618, a second guide rail 620, and an electrical connector rail 622. The electrical connector rail 622 extends longitudinally within the elongate passage 604 and includes the electrical receptacle 602. The electrical connector rail 622 is sized and shaped complementary to the electrical connector slots 422, 522 of the first and second battery packs 400, 500 such that the electrical connector rail 622 is insertable into each of the electrical connector slots 422, 522. The first guide rail 618 extends longitudinally within the passage 604, and is sized and shaped to cooperatively engage the first guide slots 418, 518 of each of the first and second battery packs 400, 500. The second guide rail 620 extends longitudinally within the passage 604, and is sized and shaped to cooperatively engage the second guide slots 420, 520 of each of the first and second battery packs 400, 500. In the example embodiment, the second guide rail 620 is positioned generally opposite the first guide rail 618 within the elongate passage 604, although the first and second guide rails 618, 620 may have any suitable relative positioning that enables the appliance 100 to function as described herein.

In the illustrated embodiment, each of the first and second guide rails 618, 620 is positioned closer to the insertion opening 610 than the electrical connector rail 622. As a result, the first and second guide rails 618, 620 engage the first and second battery packs 400, 500 (specifically, the first guide slots 418, 518 and the second guide slots 420, 520) before the electrical connector rail 622 engages the electrical connector slots 422, 522. Additionally, as illustrated in FIG. 18, the elongate passage 604 is outwardly flared at the insertion end 606. The outward flare of the elongate passage 604 facilitates insertion of the first and second battery packs 400, 500 by permitting a certain degree of misalignment as the battery pack (e.g., first battery pack 400) is initially inserted into the elongate passage 604. As the battery pack is inserted, the flared shape of the elongate passage 604 will gradually align the battery pack with the elongate passage 604 such that the first and second guide rails 618, 620 of the battery receptacle 120 will be aligned with corresponding guide slots of the battery pack.

As illustrated in FIGS. 16 and 17, the battery receptacle 120 of the illustrated embodiment has a generally rectangular or pseudo-rectangular cross-section within a plane oriented perpendicular to the insertion direction 122. The battery receptacle 120 includes a first wall 624 (also referred to as a "top" of the battery receptacle 120), a second wall 626 (also referred to as a "bottom" of the battery receptacle 120) positioned opposite the first wall 624, a first side wall 628 extending between the first wall 624 and the second wall 626, and a second side wall 630 positioned opposite the first side wall 628 and extending between the first wall 624 and the second wall 626. The top 624 and bottom 626 are oriented generally parallel to one another and perpendicular to each of the first side wall 628 and the second side wall 630. The electrical connector rail 622 protrudes from the first side wall 628, the first guide rail 618 protrudes from the first wall 624, and the second guide rail 620 protrudes from the opposing second wall 626. In other embodiments, the first guide rail 618, the second guide rail 620, and the electrical connector rail 622 may be located at any suitable location within the battery receptacle 120 that enables the appliance 100 to function as described herein.

With reference to FIGS. 14-18, in operation, the first battery pack 400 is inserted into the elongate passage 604 of the battery receptacle 120 by positioning the second end 406 of the first battery pack 400 adjacent the insertion end 606 (e.g., within the insertion opening 610) of the battery receptacle 120. The user may grasp the first battery pack 400 by grabbing the first battery pack handle 410 to facilitate insertion of the first battery pack 400 into the battery receptacle 120. The first battery pack 400 is then moved in the insertion direction 122 until the first and second guide rails 618, 620 engage the first and second guide slots 418, 420 of the first battery pack 400. Engagement between the first and second guide rails 618, 620 and the first and second guide slots 418, 420 will align the first battery pack 400 within the elongate passage 604 both vertically and horizontally such that the electrical connector slot 422 of the first battery pack 400 is aligned with the electrical connector rail 622 of the battery receptacle 120. Continued insertion of the first battery pack 400 in the insertion direction 122 will cause the electrical connector rail 622 to engage the electrical connector slot 422 of the first battery pack 400 to align the electrical connector 416 of the first battery pack 400 with the electrical receptacle 602 of the battery receptacle 120. The first battery pack 400 is further inserted into the battery receptacle 120 until the electrical connector 416 of the first battery pack 400 engages and connects to the electrical receptacle 602. The second battery pack 500 may be inserted into the battery receptacle 120 in a similar manner (e.g., after the first battery pack 400 is removed from the battery receptacle 120).

In some embodiments, a battery pack may be inserted into and connected to the battery receptacle 120 while the appliance 100 is positioned on a user's back. For example, during use (i.e., while the appliance 100 is positioned on a user's back), a user may need to exchange a depleted battery pack (e.g., the first battery pack 400) with another, charged battery pack (e.g., the second battery pack 500). To do so, the user may first remove the first battery pack 400 from the battery receptacle 120 while the appliance 100 is on the user's back, and subsequently insert the second battery pack 500 into the battery receptacle 120 while the battery-powered appliance is on the user's back. To insert the second battery pack 500 into the battery receptacle 120, the user may initially engage one or both of the first and second guide slots 518, 520 of the second battery pack 500 with one or both of the first and second guide rails 618, 620 of the battery receptacle 120 and, subsequently, engage the electrical connector slot 522 of the second battery pack 500 with the electrical connector rail 622 of the battery receptacle 120. The user may then continue inserting the second battery pack 500 in the insertion direction 122 into the battery receptacle 120 until the electrical connector 516 of the second battery pack 500 engages and connects to the electrical receptacle 602 of the battery receptacle 120.

As described above, the battery receptacle 120 of the present disclosure provides multiple rails to facilitate insertion and connection of different sized battery packs therein. In particular, the battery receptacle 120 includes a dual-rail locking system having two different types of rails—an electrical connector rail 622 and guide rails 618, 620. The electrical connector rail 622 guides the battery pack into electrical connectors within the battery receptacle 120, and the secondary guide rails 618, 620 facilitate guiding the battery pack blindly, as well as facilitate installation of different sized battery packs within the same size battery receptacle 120.

The dual-rail system allows battery packs of different physical sizes to be installed in a common passage or aperture (e.g., elongate passage 604) on a product or tool (e.g., appliance 100). The guide rails 618, 620 provide guidance for smaller battery packs installed in the battery receptacle 120 that do not occupy the entire width or space of the battery receptacle passage, and guide or lead the smaller battery packs into the electrical connection rail system to facilitate connection of the smaller battery pack to the electrical receptacle 602 of the battery receptacle 120. Additionally, the use of two guide rails (e.g., guide rails 618, 620) provides additional strength to the connection between the battery receptacle 120 and the battery packs 400, 500 as compared to rail systems that include a single guide rail or no guide rails.

Referring again to FIGS. 7 and 12, the first and second battery packs 400, 500 of the illustrated embodiment each include a respective gauge 438, 538 located on the handle 410, 510, respectively. The gauges 438, 538 are generally configured to indicate a charge level of the respective battery pack 400, 500. While only the first battery pack gauge 438 is described below in detail, it should be understood that the second battery pack gauge 538 may have the same or similar construction as the first battery pack gauge 438 and operate in the same or similar manner as the first battery pack gauge 438.

The gauge 438 of the first battery pack 400 is located on an outer surface 440 of the handle 410 (i.e., a surface positioned opposite and facing away from the aperture 414) so that the gauge 438 is readily viewable by a user of the first battery pack 400. The gauge 438 includes a plurality of lights 442 that are illuminated based on a charge level of the first battery pack 400.

The gauge 438 of the illustrated embodiment includes 4 lights, although it should be understood that the gauge 438 may include any suitable number of lights that enables the gauge to function as described herein, including greater than or less than 4 lights. Additionally, in the illustrated embodiment, the lights 442 are light emitting diodes covered by a suitable cover (e.g., a light diffusing cover), though it should be understood that the lights 442 may include any suitable light emitting device that enables the gauge 438 to function as described herein. Moreover, while the gauge 438 in the example embodiment is described as illuminating a number of the plurality of lights 442 that corresponds to a charge level of the first battery pack 400, it should be understood that the gauge 438 may use different modes of illumination to indicate a charge level. In some embodiments, for example, the gauge 438 can include a single light 442 that is illuminated upon activation of the actuator 452 to indicate a charge level of the battery pack 400. The single light 442 can be illuminated, for example, for a number of pulses or a duration of time that corresponds to a charge level of the battery pack (e.g., 4 pulses to indicate a charge level greater than 80%, 3 pulses to indicate a charge level between 60% and 80%, 2 pulses to indicate a charge level between 40% and 60%, and 1 pulse to indicate a charge level between 20% and 40%). Additionally or alternatively, the single light 442 can be illuminated different colors to indicate a state of charge. For example, the single light 442 can illuminate green to indicate a fully charged battery pack (e.g., greater than 80%), yellow to indicate a medium state of charge of the battery back (e.g., between 30% and 70%), and red to indicate a low state of charge (e.g., less than 30%).

Figure 19:
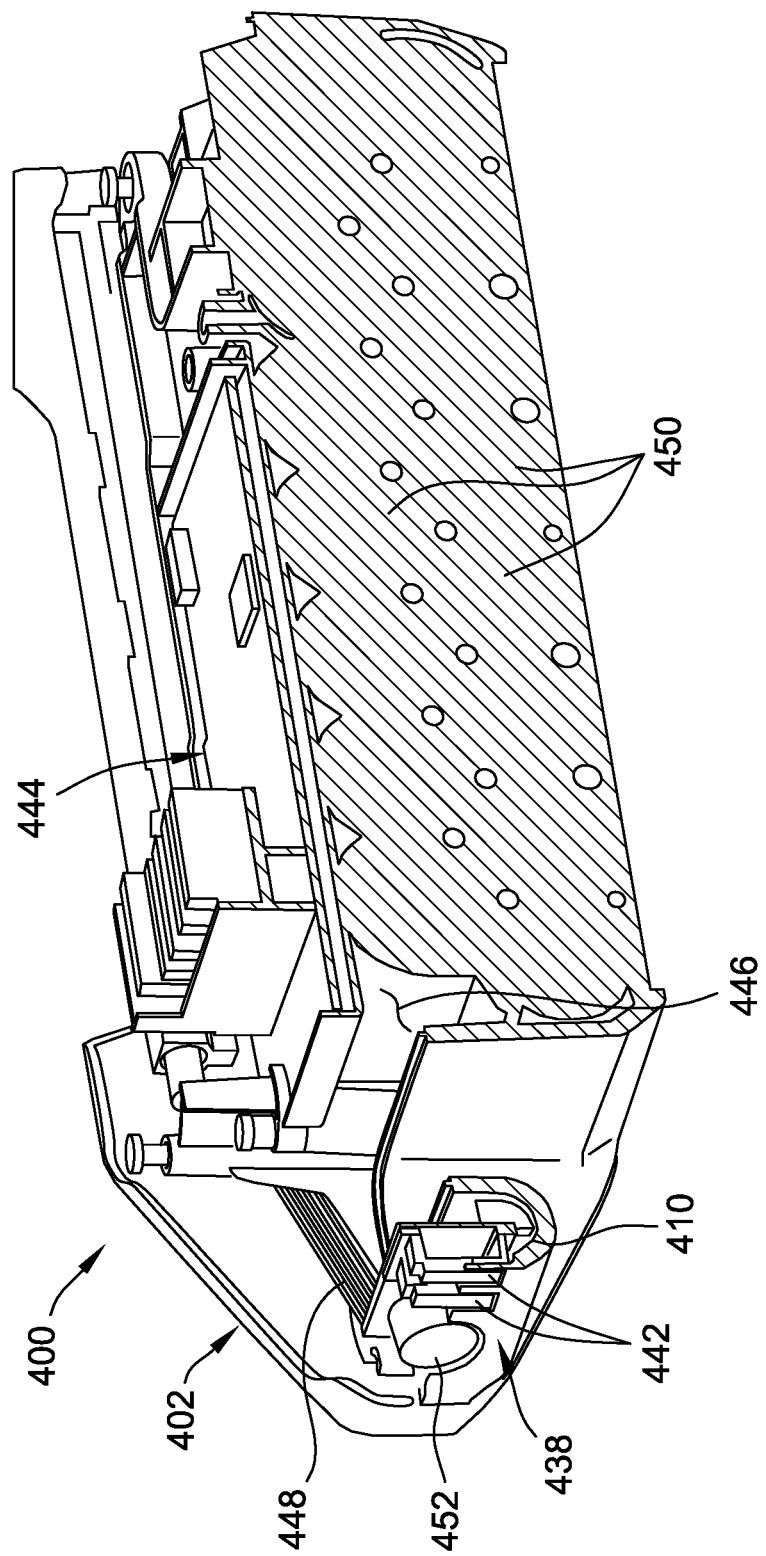
FIG. 19 is a sectional view of the first battery pack shown in FIG. 4.

With additional reference to FIG. 19, the gauge 438 is electrically connected to a printed circuit board assembly (PCBA) 444 enclosed within an internal cavity 446 defined by the first battery pack housing 402 by one or more electrical conduits 448. A portion of the first battery pack housing 402 is omitted from FIG. 19 to illustrate internal features of the first battery pack 400. The PCBA 444 may be implemented as and/or include components of the controller 206. Battery cells 450 of the first battery pack 400 are also enclosed within the internal cavity 446. The PCBA 444 is electrically connected to the battery cells 450 to receive electrical power therefrom and/or control the supply of electrical power therefrom.

The gauge 438 is configured to illuminate a number of the plurality of lights 442 that corresponds to a charge level of the first battery pack 400 (specifically, a charge level of the battery cells 450). For example, if a charge level of the battery cells 450 is at or near 100% (e.g., greater than 80%) all of the lights 442 (i.e., four lights) are illuminated when the gauge 438 is activated. When the charge level of the battery cells 450 is at or near 50% (e.g., between 40% and 60%), only half of the lights 442 (i.e., two lights) are illuminated. In one particular embodiment, the gauge 438 is configured to illuminate a number of the plurality of lights 442 according to the following table:

| Charge Level (%) | Number of Lights Illuminated |
| --- | --- |
| 80-100% | All (4) lights |
| 60-80% | 3 lights |
| 40-60% | 2 lights |
| 20-40% | 1 light |
| 0-20% | 0 lights |

In the illustrated embodiment, the gauge 438 is activated by actuation of an actuator 452 attached to the first battery pack housing 402, specifically on the handle 410. In the illustrated embodiment, the actuator 452 is a depressible button, although it should be understood that the actuator 452 may include any suitable actuator that enables the gauge 438 to function as described herein. The button and the plurality of lights 442 are arranged linearly along the handle 410 in the illustrated embodiment, specifically along the outer surface 440 of the handle 410.

Actuation of the actuator 452 activates the gauge 438 to illuminate a number of the plurality of lights 442 that corresponds to the charge level of the at battery cells 450.

Additionally or alternatively, the gauge 438 may be activated based on detected motion or movement of the first battery pack 400. For example, the first battery pack 400 may include an accelerometer that detects motion (e.g., when the battery pack is picked up), and automatically activates the gauge 438 based on the detected motion.

The gauge 438 illustrated in FIGS. 7 and 19 is visible primarily from a viewing direction that is parallel to and opposite the direction in which the handle 410 extends from the main body 408 (i.e., the first direction 412). In other embodiments, the gauge 438 may be visible from multiple orthogonal directions to facilitate visibility of the gauge 438. FIGS. 20-22, for example, illustrate a gauge 700 that is visible from a first viewing direction 702 that is parallel to and opposite the direction in which the handle 704 extends from the main body 706 (i.e., a first direction), a second viewing direction 708 orthogonal to the first viewing direction 702, and a third viewing direction 710 that is parallel to and opposite the second viewing direction 708. In particular, in the embodiment illustrated in FIGS. 20-22, each light 712 extends or wraps around the handle 704 such that a first portion of each light 712 is visible from the second viewing direction 708 and a second portion of each light 712 is visible from the third viewing direction 710. As a result, the gauge 700 can be viewed from multiple (e.g., three) orthogonal viewing directions to facilitate visibility of the gauge 700.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A battery pack connection system for a battery-powered appliance comprising:
   a first battery pack and a second battery pack, each of the first and second battery packs comprising a housing having a main body and a handle extending from the main body, the handle defining an aperture sized and shaped to receive one or more of a user's fingers therein, the housing including a first guide slot, a second guide slot, and an electrical connector slot including an electrical connector, the second battery pack having a power capacity and a width greater than the first battery pack; and
   a battery receptacle defining an elongate passage extending longitudinally from an insertion end to a terminal end, the elongate passage sized and shaped to separately receive each of the first and second battery packs therein, the battery receptacle comprising:
   an electrical connector rail extending longitudinally and including an electrical receptacle that electrically connects to the electrical connector of each of the first and second battery packs;
   a first guide rail extending longitudinally within the passage and sized and shaped to cooperatively engage the first guide slot of each of the first and second battery packs; and
   a second guide rail extending longitudinally within the passage and sized and shaped to cooperatively engage the second guide slot of each of the first and second battery packs; and
   a reserve section sized and shaped to receive a portion of the second battery pack therein, wherein the reserve section is unoccupied by the first battery pack when the first battery pack is electrically connected to the electrical receptacle, and wherein the reserve section is occupied by the second battery pack when the second battery pack is electrically connected to the electrical receptacle.

2. The battery pack connection system of claim 1, wherein the battery receptacle includes a first wall, a second wall positioned opposite the first wall, and a side wall extending between the first wall and the second wall, wherein the electrical connector rail protrudes from the side wall, the first guide rail protrudes from the first wall, and the second guide rail protrudes from the opposing second wall.

3. The battery pack connection system of claim 1,
wherein the housing extends longitudinally from a first end to a second end; and
wherein the first and second battery packs have a common cross-sectional profile in a plane oriented perpendicular to the longitudinal direction.

4. The battery pack connection system of claim 3, wherein the battery receptacle includes a keyed section having a cross-sectional profile shaped complementary to the common cross-sectional profile of the first and second battery packs.

5. The battery pack connection system of claim 1, wherein each of the first and second guide rails is positioned closer to the end than the electrical connector rail such that the first and second guide rails engage the first and second guide slots, respectively, of the first and second battery packs before the electrical connection rail engages the electrical connector slot.

6. The battery pack connection system of claim 1, wherein each of the first and second battery packs comprises:
at least one battery cell enclosed within the housing;
a printed circuit board (PCBA) enclosed within the housing;
a gauge located on an outer surface of the handle and electrically connected to the PCBA, wherein the gauge includes a plurality of lights; and
an actuator attached to the housing, wherein actuation of the actuator activates the gauge to illuminate a number of the plurality of lights that corresponds to a charge level of the at least one battery cell.

7. The battery pack connection system of claim 6, wherein the handle extends away from the main body in a first direction, wherein each of the plurality of lights is visible from a first viewing direction that is parallel to and opposite the first direction, a second viewing direction orthogonal to the first viewing direction, and a third viewing direction that is parallel to and opposite the second viewing direction.

8. A battery-powered appliance system comprising:
a first battery pack;
a second battery pack having a power capacity and a width greater than the first battery pack, wherein each of the first and second battery packs comprises a housing having a main body and a handle extending from the main body, the handle defining an aperture sized and shaped to receive one or more of a user's fingers therein, the housing including a first guide slot, a second guide slot, and an electrical connector slot including an electrical connector; and
a battery-powered appliance comprising:
a battery receptacle defining an elongate passage extending longitudinally from an insertion end to a terminal end, the battery receptacle including an electrical receptacle, wherein the battery receptacle comprises:
an electrical connector rail extending longitudinally and including the electrical receptacle;
a first guide rail extending longitudinally within the passage and sized and shaped to cooperatively engage the first guide slot of each of the first and second battery packs;
a second guide rail extending longitudinally within the passage and sized and shaped to cooperatively engage the second guide slot of each of the first and second battery packs; and
a reserve section sized and shaped to receive a portion of the second battery pack therein, wherein the reserve section is unoccupied by the first battery pack when the first battery pack is electrically connected to the electrical receptacle, and wherein the reserve section is occupied by the second battery pack when the second battery pack is electrically connected to the electrical receptacle; and
a motor connected to the electrical receptacle to receive power from one of the first battery pack and the second battery pack when one of the first battery pack and the second battery pack is connected thereto;
wherein the elongate passage is sized and shaped to separately receive each of the first and second battery packs therein.

9. The battery-powered appliance system of claim 8, wherein the battery-powered appliance further comprises:
a housing, wherein the housing includes the battery receptacle and encloses the motor; and
an impeller connected to the motor and operable to generate airflow through the housing upon operation of the motor.

10. The battery-powered appliance system of claim 8, wherein the battery-powered appliance is a vacuum cleaner.

11. The battery-powered appliance system of claim 8, wherein the battery-powered appliance is a backpack vacuum cleaner.

12. The battery-powered appliance system of claim 8, wherein the battery receptacle includes a first wall, a second wall positioned opposite the first wall, and a side wall extending between the first wall and the second wall, wherein the electrical connector rail protrudes from the side wall, the first guide rail protrudes from the first wall, and the second guide rail protrudes from the opposing second wall.

13. The battery-powered appliance system of claim 8,
wherein the housing extends longitudinally from a first end to a second end; and
wherein the first and second battery packs have a common cross-sectional profile in a plane oriented perpendicular to the longitudinal direction.

14. A method comprising:
positioning a battery-powered appliance on a user's back;
removing a first battery pack from a battery receptacle of the battery-powered appliance while the battery-powered appliance is on the user's back, wherein the battery receptacle includes a reserve section that is unoccupied by the first battery pack when the first battery pack is positioned within the battery receptacle, wherein the first battery pack includes a housing having a main body and a handle extending from the main body, the handle defining an aperture sized and shaped to receive one or more of a user's fingers therein, wherein removing the first battery pack includes grabbing the handle of the first battery pack; and
inserting a second battery pack into the battery receptacle while the battery-powered appliance is on the user's back, the second battery pack being inserted by engaging a guide slot of the second battery pack with a guide rail of the battery receptacle, wherein the reserve section is occupied by the second battery pack when the second battery pack is positioned within the battery receptacle, wherein the second battery pack includes a housing having a main body and a handle extending from the main body, the handle defining an aperture sized and shaped to receive one or more of a user's fingers therein, wherein inserting the second battery pack includes grabbing the handle of the second battery pack; and engaging an electrical connector slot of the second battery pack with an electrical connector rail of the battery receptacle, wherein the second battery pack has a power capacity and a width that is different from the first battery pack.

\* \* \* \* \*